US012407467B2

(12) United States Patent
Li et al.

(10) Patent No.: US 12,407,467 B2
(45) Date of Patent: Sep. 2, 2025

(54) PHASE TRACKING REFERENCE SIGNAL CONFIGURATION FOR TRANSMISSION REPETITIONS

(71) Applicant: QUALCOMM Incorporated, San Diego, CA (US)

(72) Inventors: Qiaoyu Li, Beijing (CN); Chao Wei, Beijing (CN); Alexandros Manlakos, Escondido, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 17/790,106

(22) PCT Filed: Feb. 27, 2020

(86) PCT No.: PCT/CN2020/076908
§ 371 (c)(1),
(2) Date: Jun. 29, 2022

(87) PCT Pub. No.: WO2021/168720
PCT Pub. Date: Sep. 2, 2021

(65) Prior Publication Data
US 2023/0067557 A1    Mar. 2, 2023

(51) Int. Cl.
*H04L 5/00* (2006.01)
*H04L 1/00* (2006.01)
*H04L 1/08* (2006.01)

(52) U.S. Cl.
CPC .......... *H04L 5/0051* (2013.01); *H04L 1/0003* (2013.01); *H04L 1/08* (2013.01)

(58) Field of Classification Search
CPC ....... H04L 5/0051; H04L 1/0003; H04L 1/08; H04L 1/0009; H04L 1/1893;
(Continued)

(56) References Cited

U.S. PATENT DOCUMENTS 12,301,400 B2 *  5/2025  Shahmohammadian ....................
                                                                   H04L 5/0048
2018/0073680 A1   3/2018  Arlt et al.
(Continued)

FOREIGN PATENT DOCUMENTS

CN    109586868 A    4/2019
CN    110519032 A    11/2019
(Continued)

OTHER PUBLICATIONS

Supplementary European Search Report—EP20921035—Search Authority—The Hague—Oct. 20, 2023.
(Continued)

*Primary Examiner* — Brian J. Gillis
*Assistant Examiner* — Thao D Duong
(74) *Attorney, Agent, or Firm* — Procopio, Cory, Hargreaves & Savitch LLP

(57) ABSTRACT

An apparatus receives a configuration for a phase tracking reference signal (PT-RS). The apparatus then determines at least one of a time density or a frequency density for the PT-RS based on inter-slot repetition of a transmission. The apparatus then receives or transmits the PT-RS based on the at least one of the time density or the frequency density determined based on the inter-slot repetition of the transmission.

40 Claims, 15 Drawing Sheets

(58) Field of Classification Search
CPC ... H04L 5/0005; H04L 5/0044; H04L 5/0048; H04L 5/0053; H04L 5/0094; H04L 5/0007

See application file for complete search history.

(56) References Cited

U.S. PATENT DOCUMENTS

| | | |
|---|---|---|
| 2019/0166607 A1 | 5/2019 | Zhou et al. |
| 2019/0260466 A1 | 8/2019 | Bai et al. |
| 2020/0008102 A1 | 1/2020 | Yokomakura et al. |
| 2020/0022139 A1 | 1/2020 | Zhou et al. |
| 2020/0314817 A1* | 10/2020 | Sun ........................ H04W 72/23 |
| 2021/0143964 A1* | 5/2021 | Frenne .................. H04L 5/0035 |
| 2021/0259005 A1* | 8/2021 | Yoshioka ............ H04L 27/2602 |
| 2022/0361200 A1* | 11/2022 | Yoshioka .............. H04L 5/0048 |
| 2022/0368568 A1* | 11/2022 | Taherzadeh Boroujeni ................ H04W 72/23 |
| 2023/0067557 A1* | 3/2023 | Li ......................... H04L 1/0003 |
| 2023/0412336 A1* | 12/2023 | Cha ....................... H04W 72/51 |

FOREIGN PATENT DOCUMENTS

| | | |
|---|---|---|
| WO | 2018227209 A1 | 12/2018 |
| WO | 2019160606 A1 | 8/2019 |

OTHER PUBLICATIONS

International Search Report and Written Opinion—PCT/CN2020/076908—ISAEPO—Nov. 26, 2020.

Panasonic: "On PUSCH Enhancements for NR URLLC", 3GPP Draft, 3GPP TSG RAN WG1 Meeting #95, R1-1813133, Spokane, USA, Nov. 12-16, 2018, Nov. 16, 2018 (Nov. 16, 2018), 4 Pages, the whole document.

* cited by examiner

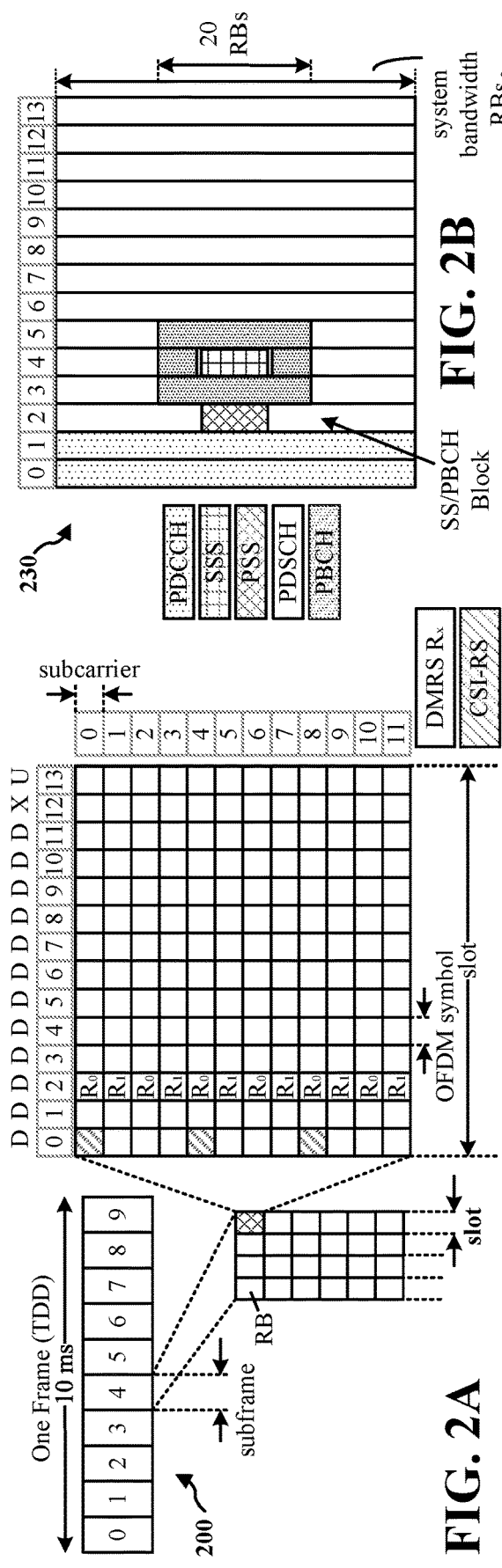
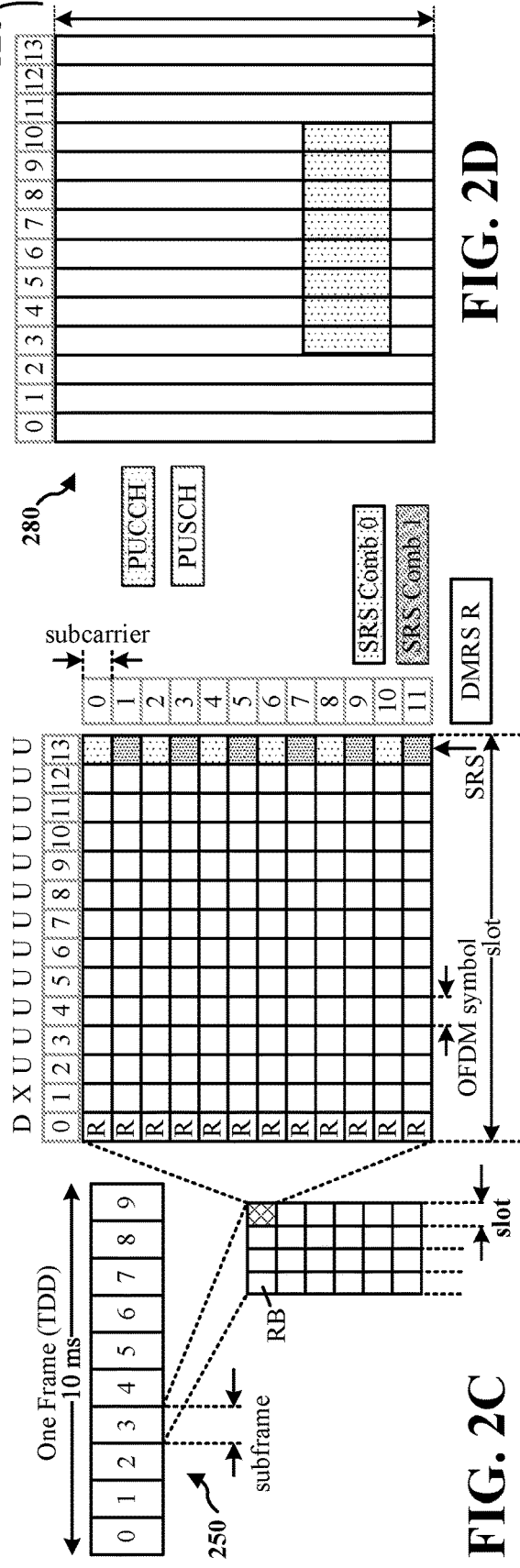
FIG. 2A  FIG. 2B  FIG. 2C  FIG. 2D

PHASE TRACKING REFERENCE SIGNAL CONFIGURATION FOR TRANSMISSION REPETITIONS

CROSS REFERENCE TO RELATED APPLICATION

This application is a National Stage Application filed under 35 U.S.C. § 371 of PCT International Patent Application Serial No. PCT/CN2020/076908, entitled "PHASE TRACKING REFERENCE SIGNAL CONFIGURATION FOR TRANSMISSION REPETITIONS", and filed on Feb. 27, 2020, which is expressly incorporated by reference herein in its entirety.

BACKGROUND

Technical Field

The present disclosure relates generally to communication systems, and more particularly, to a wireless communication involving a phase tracking reference signal.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives a configuration for a phase tracking reference signal (PT-RS). The apparatus determines at least one of a time density or a frequency density for the PT-RS based on inter-slot repetition of a transmission. The apparatus receives or transmits the PT-RS based on the at least one of the time density or the frequency density determined based on the inter-slot repetition of the transmission.

In an aspect of the disclosure, a method, a computer-readable medium, and an apparatus are provided for wireless communication at a base station. The apparatus configures a UE for a PT-RS. The apparatus determines at least one of a time density or a frequency density for the PT-RS based on inter-slot repetition of a transmission. The apparatus receives or transmits the PT-RS based on the at least one of the time density or the frequency density determined based on the inter-slot repetition of the transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5C/NR frame, DL channels within a 5G/NR subframe, a second 5G/NR frame, and UL channels within a 5C/NR subframe, respectively.

DETAILED DESCRIPTION

Figure 1:
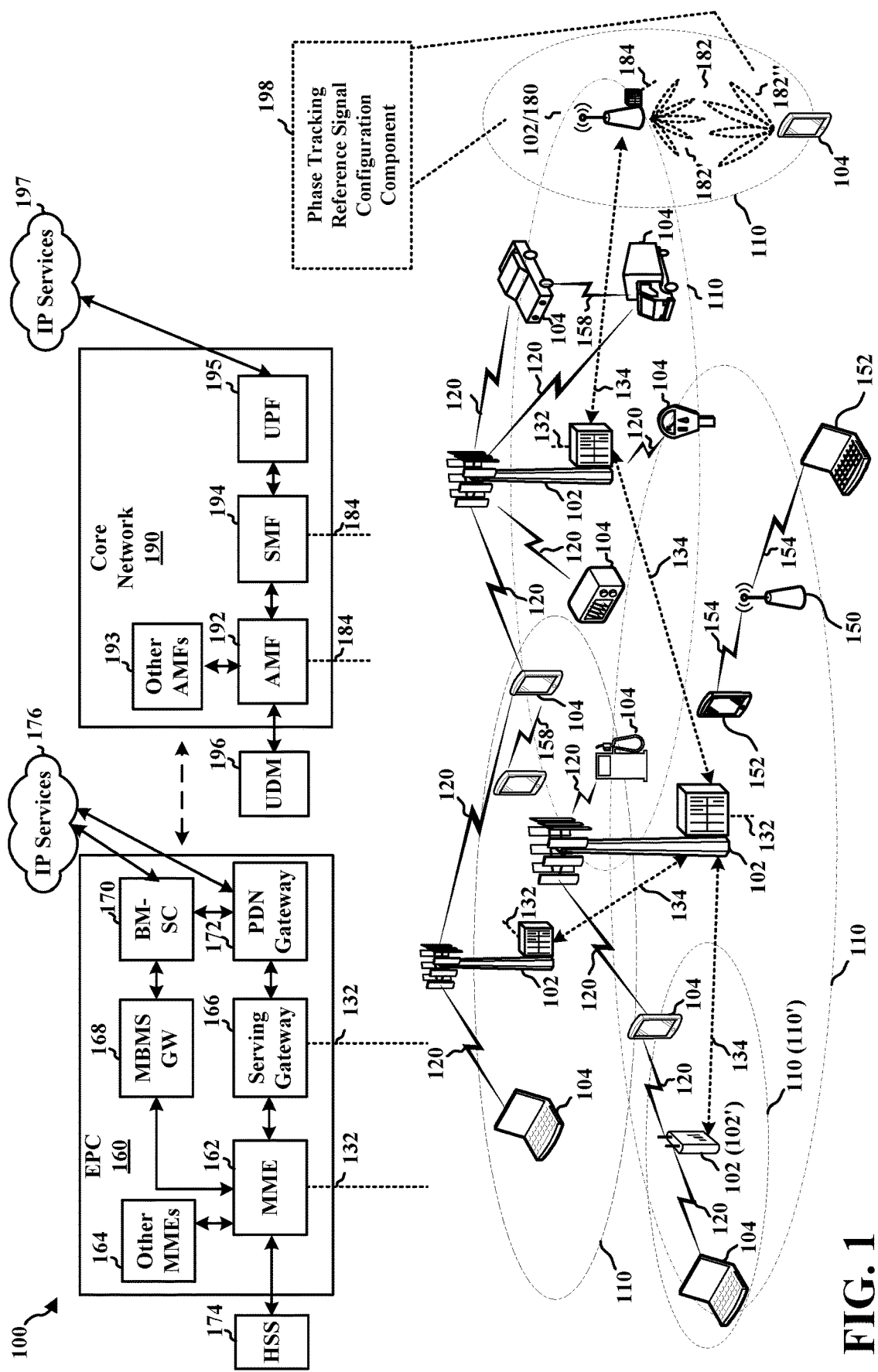
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the base station 102 or 180 may include an PT-RS configuration component 198 configured to determine the density of a PT-RS in a time domain and/or a frequency domain based, at least in part, on inter-slot repetition levels for a corresponding physical uplink shared channel (PUSCH) or physical downlink shared channel (PDSCH). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2 slots/subframe. The subcarrier spacing and symbol length/duration are a function of the numerology. The subcarrier spacing may be equal to $2^\mu*15$ kHz, where p is the numerology 0 to 5. As such, the numerology p=0 has a subcarrier spacing of 15 kHz and the numerology p=5 has a subcarrier spacing of 480 kHz. The symbol length/duration is inversely related to the subcarrier spacing. FIGS. 2A-2D provide an example of slot configuration 0 with 14 symbols per slot and numerology p=2 with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
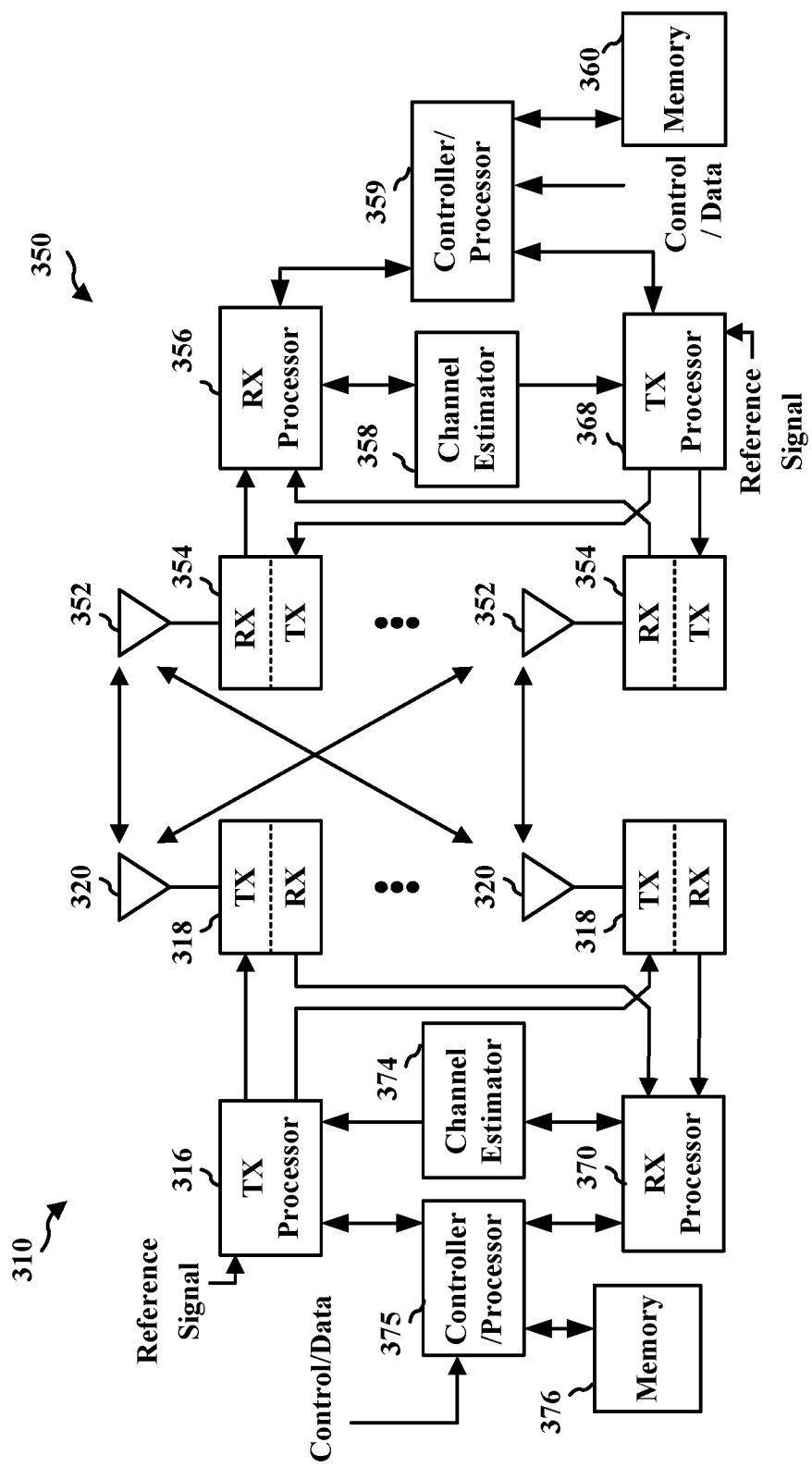
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separale transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with 198 of FIG. 1. At least one of the TX processor 316, the RX processor 370, and the controller/processor 375 of the base station 310 may be configured to perform aspects in connection with 198 of FIG. 1.

Wireless communication, such as based on NR, may include communication in frequency band ranges above 6 GHz to enable the wireless communication networks and devices to have more flexibility and scalability. However, at high frequency bands, such as Frequency Range 2 (FR2) that covers 24.25 to 52.60 GHz or higher, radio propagation may become more difficult compared to lower frequency bands. For example, as frequency increases, wavelength decreases and shorter wavelengths are more susceptible to atmospheric and environmental interference, such as being absorbed by physical barriers like walls and ceilings. As such, in higher frequency spectrums, coverage enhancement is helpful for wireless communications and devices to improve the coverage and latency of wireless communications.

Coverage enhancement may improve communication in Frequency Range 1 (FR1) that covers 410 MHz-7125 MHz. In urban settings, coverage enhancement may improve communication between an outdoor base station serving indoor UEs. In rural settings, for example, coverage enhancement may improve communication for a base station serving long distance UEs, such as at 30 km from the base station. Coverage enhancement may be used to improve communication between the UE and the base station may include various services including voice-over-internet-protocol (VOIP), eMBB, etc. and may include downlink and/or uplink communication. In some examples, coverage enhancement for communication in the FR1 spectrum may be structured to improve uplink communication including PUSCH and/or PUCCH. For example, in an urban setting, a target downlink throughput may be approximately 10 Mbps and a target uplink throughput may be approximately 1 Mbps. In a rural setting, a target downlink throughput may be approximately 1 Mbps and a target uplink throughput may be approximately 100 kbps.

For FR2, an indoor base station may serve indoor UEs. In urban and/or rural settings, an outdoor base station may serve outdoor UEs and/or indoor UEs. Coverage enhancement may be used to improve communication including services such as eMBB, VOIP, etc. Coverage enhancement may address downlink and/or uplink communication. For example, in an indoor setting, a target downlink throughput may be approximately 25 Mbps and a target uplink throughput may be approximately 5 Mbps. In an urban setting, a target downlink throughput may be approximately 25 Mbps and a target uplink throughput may be approximately 5 Mbps. In a suburban setting, a target downlink throughput may be approximately 1 Mbps and a target uplink throughput may be approximately 50 kbps.

For example, as high frequency communication devices and network access points are more likely to encounter phase noise due to the mismatch of transmitter and receiver frequency oscillators, a PT-RS may be used to compensate for the phase noise by enabling phase tracking of the oscillator at a transmitter and/or receiver. The PT-RS may help in the suppression of phase noise and common phase error, especially at mmW frequencies, and the PT-RS may present in both uplink channels (such as PUCCH and/or PUSCH) and/or downlink channels (such as PDCCH and/or PDSCH).

Figure 4:
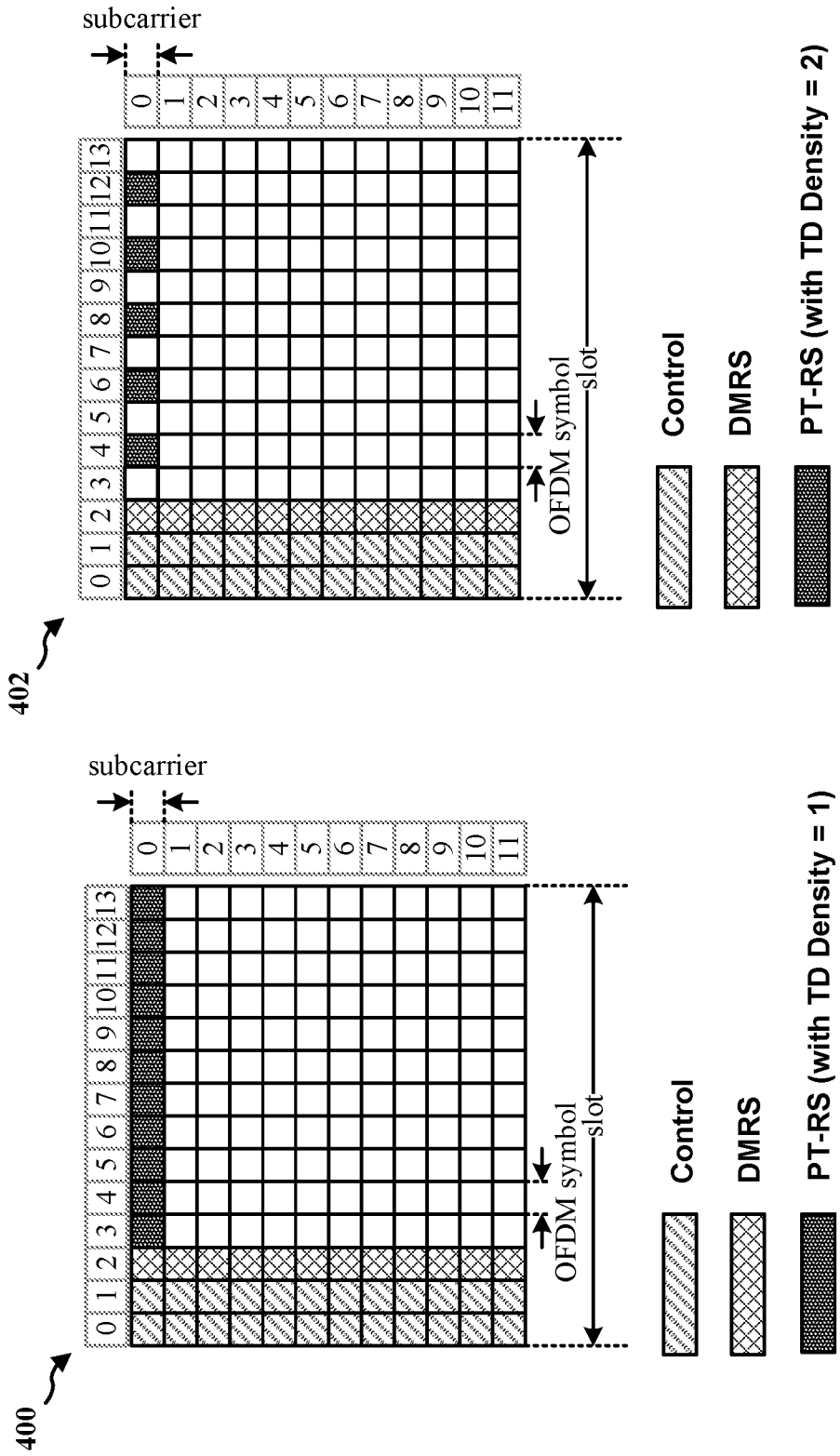
FIGS. 4A and 4B are example diagrams illustrating PT-RS with different time densities in a resource grid.

FIGS. 4A and 4B are example diagrams (400, 402) illustrating PT-RS with different time densities in a resource grid. For example, the resource grid in FIG. 4A has PT-RS with time density of one, which means there is one PT-RS in every symbol. The resource grid in FIG. 4B has PT-RS with time density of two, which means there is one PT-RS in every two symbols. As such, the resource grid in FIG. 4A has higher PT-RS density than the resource grid in FIG. 4B. Due to phase noise properties, PT-RS usually has low density in frequency domain and high density in time domain. PT-RS may be associated with one DMRS port during transmission and used for both PDSCH and PUSCH. As shown by FIGS. 4A and 4B, PT-RS information may be mapped to a few subcarriers per symbol because the phase rotation affects all sub-carriers within an OFDM symbol equally. Although the examples in FIGS. 4A and 4B illustrate the PT-RS in a single subcarrier, this is merely to illustrate the concept of different time densities for the PT-RS and different time densities may be applied to PT-RS having various frequency densities.

A Block Error Ratio (BLER) is the ratio of the number of erroneous blocks received to the total number of blocks transmit in a transmission. The BLER may be used to determine show the quality of a transmission, where a lower BLER indicates a better transmission quality. In general, a better BLER performance may be achieved with higher PT-RS density. When the density of PT-RS is high, phase tracking accuracy is high, and a common phase error may be better compensated to achieve better transmission performance. However, there is a trade-off between phase tracking accuracy and signaling overhead due to the added density of the PT-RS. The increased overhead may have an effect on the actual throughput (e.g., $P_{pd}$) (e.g., ratio of data transmitted in unit of time) of a transmission. As shown by FIGS. 4A and 4B, higher PT-RS density may result in larger signal overhead as more resources are used by PT-RS. Similarly, a PT-RS density that is higher in the frequency spectrum increases the overhead of the PT-RS. This may lead to lower spectrum efficiency (SE) as number of information (i.e., bits) transmitted per second per Hz is reduced for larger signal overhead.

In a transmission with smaller (e.g., narrow) bandwidth, increasing the density of PT-RS may only provide a relatively small BLER gain for the transmission, but may not help with improving throughput performance of the transmission. For smaller bandwidth transmissions, the number of code blocks might be small within a scheduled TB, so that more time domain diversity may be achieved by the code blocks. This may itself improve the quality of the transmission (i.e., reduces BLER). Thus, the small BLER gain contributed by increasing the density of PT-RS may not be worth of having a large overhead for smaller bandwidth transmission.

On the other hand, for a transmission with a larger (e.g., wide) bandwidth, increasing the density of PT-RS may help improve throughput performance. In a larger bandwidth transmission, the time domain diversity for code blocks may be lower compared to smaller bandwidth transmission because the number of code blocks might be bigger within a scheduled TB. As the time domain diversity is low, introducing more PT-RS may help achieve more BLER gain for the transmission. Thus, the BLER improvement contributed by increasing the density of PT-RS may be worth the increased overhead for larger bandwidth transmission.

The time density of a PT-RS may be based on the scheduled MCS of the transmission. For example, the time density may be determined using a table that compares the MCS for the transmission to a configured MCS. Table 1 below is an example time density of PT-RS as a function of scheduled MCS, and Table 2 below is an example frequency density of PT-RS as a function of scheduled bandwidth.

In Table 1, $L_{PT-RS}$ represents the time density for the PT-RS, and may refer to a time interval between the last DM-RS symbol and the first PT-RS symbol and may refer to a time interval between PT-RS symbols. For example, in FIG. 4A, with a time density of "1" the first PT-RS symbol may be in the first symbol following DM-RS, and in each symbol of the transmission. In FIG. 4B, with a time density of "2", the first symbol may be in the second symbol following DM-RS, and a PT-RS may be transmitted in a second symbol following a prior PT-RS. Similarly, if the time density is "4", the first PT-RS symbol may be the fourth symbol following the DM-RS, and the fourth symbol following a prior PT-RS transmission. In Table 1, $I_{MCS}$ refers to the MCS for the scheduled transmission (e.g., PUCCH, PUSCH, PDCCH, PDSCH); ptrs-MCS1 corresponds to a first configured threshold value; ptrs-MCS2 corresponds to a second configured threshold value; ptrs-MCS3 corresponds to a third configured threshold value; and ptrs-MCS4 corresponds to a fourth configured threshold value.

TABLE 1

Time density of PT-RS as a function of scheduled MCS

| Scheduled MCS | Time (TD) density($L_{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

In Table 2, $K_{PT-RS}$ corresponds to the frequency density of the PT-RS, which is illustrated as being a function of the scheduled bandwidth (e.g., $N_{RB}$) for the corresponding transmission (e.g., PUCCH, PUSCH, PDCCH, PDSCH). $N_{RB0}$ and $N_{RB1}$ correspond to configured threshold values.

TABLE 2

Frequency density of PT-RS as a function of scheduled bandwidth

| Scheduled bandwidth | Frequency (FD) density ($K_{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

For example, when transform precoding is not enabled and if a UE is configured with a higher layer parameter such as phaseTrackingRS, such as in a DMRS configuration, the higher layer parameters for time density (e.g., tineDensity) and frequency density (e.g., frequencyDensity) in a PT-RS configuration may indicate the threshold values ptrs-MCS$_i$, i=1, 2, 3 and N$_{RB,i}$, i=0, 1, as shown in Table 1 and Table 2, respectively. The threshold values may be RRC configured, and may be configured separately for uplink and downlink communication (e.g., being configured separately for a PDSCH configuration and a PUSCH configuration).

The UE may assume the PT-RS antenna ports' presence and pattern are a function of the corresponding scheduled MCS and scheduled bandwidth in a corresponding bandwidth part as shown in Table 1 and Table 2, respectively. If the higher layer parameter timeDensity is not configured, the UE may assume $L_{PT-RS}$=1. If the higher layer parameter frequencyDensity is not configured, the UE may assume $K_{PT-RS}$=2. If none of the higher layer parameters tinwDensity and frequencyDensity in PTRS-UplinkConfig are configured, the UE may assume $L_{PT-RS}$=1 and $K_{PT-RS}$=2.

If either or both of the parameters PT-RS time domain density ($L_{PT}$-R$_s$) and PT-RS frequency domain density ($K_{PT-RS}$), shown in Table 1 and Table 2 respectively, indicate "PT-RS is not present" or "n.p.", the UE may assume that PT-RS is not present, e.g., is not transmitted. If a base station configures the same adjacent MCS boundary values (i.e., ptrs-MCS$_i$=ptrs-MCS$_{i+1}$, or N$_{RBi}$=N$_{RBi+1}$), the identified frequency/time domain PR-TS density values associated with the associated MCS/BW may be considered as disabled.

Figure 5:
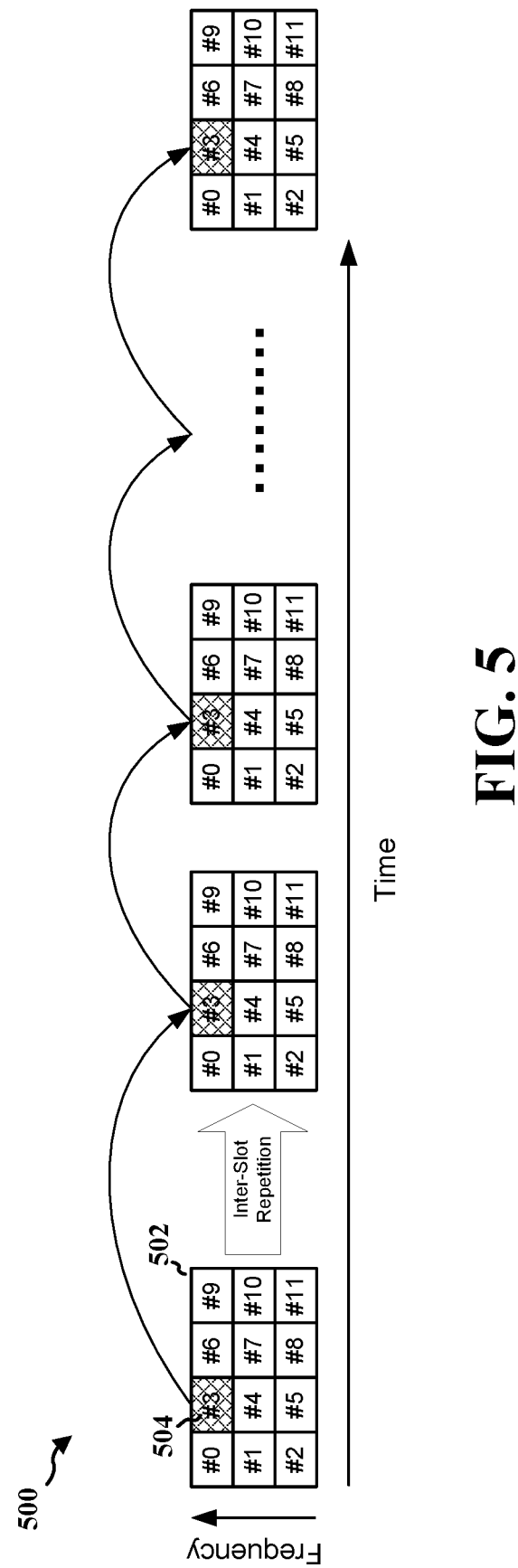
FIG. 5 is a diagram showing example data transmission repetition in frequency and time domain.

To improve data transmission and to have higher successful data transmission rate especially over a noisy channel, a same data transmission (e.g., PDSCH, PUSCH etc.) may be configured and scheduled to be transmitted repeatedly as PDSCH repetitions or PUSCH repetitions. As a noisy channel may corrupt the transmission in a few places, transmitting a repetition of the same data transmission may increase a success rate of the transmission. FIG. 5 is a diagram 500 showing example data transmission repetition in. In FIG. 5, a code block 504 (e.g., #3) in a TB 502 is transmitted repeatedly over different time slots using the same frequency bandwidth. The repeated transmission of the code block 504 may be referred to as inter-slot repetitions.

Figure 6:
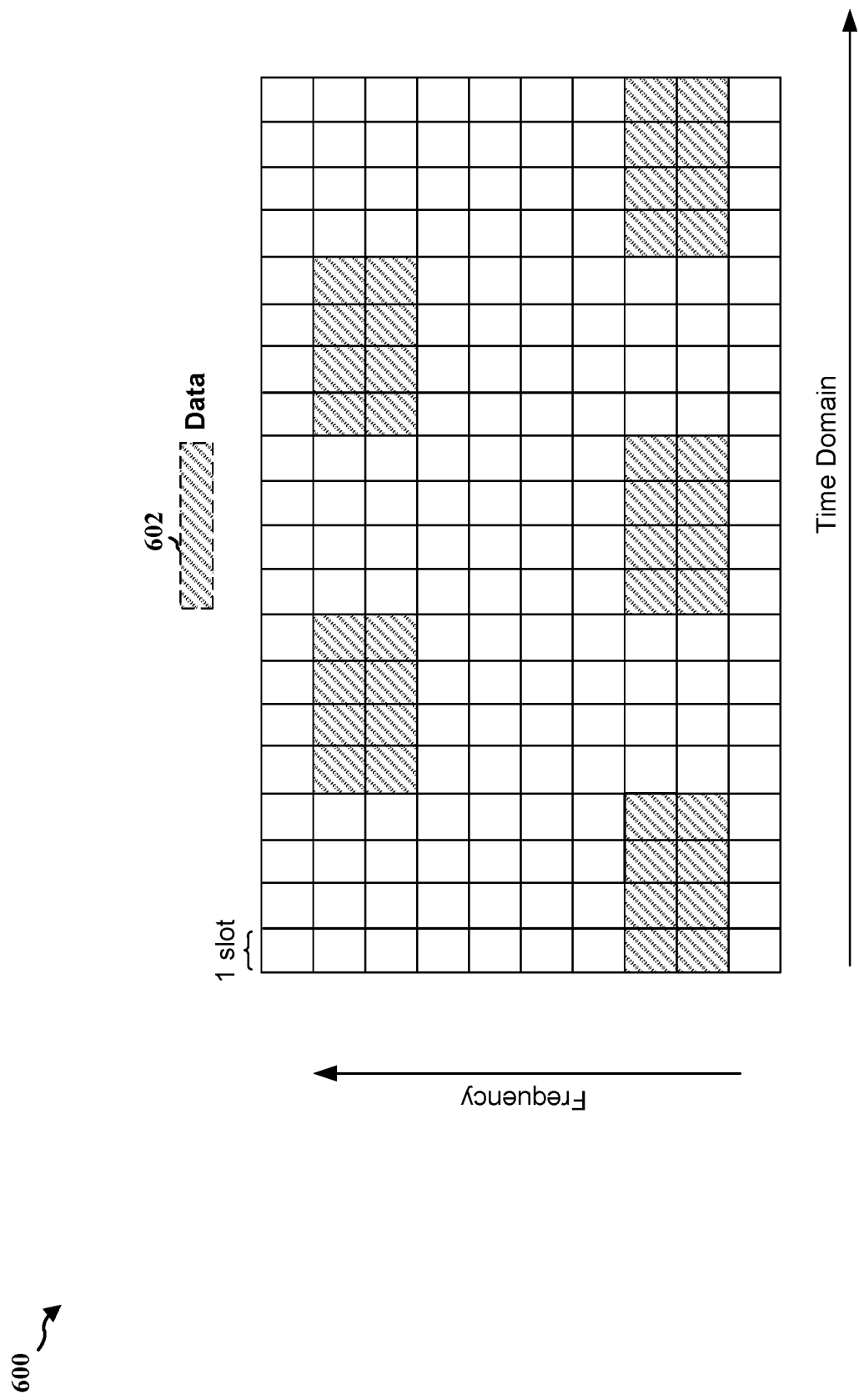
FIG. 6 is a diagram showing example frequency hopping.
Figure 7:
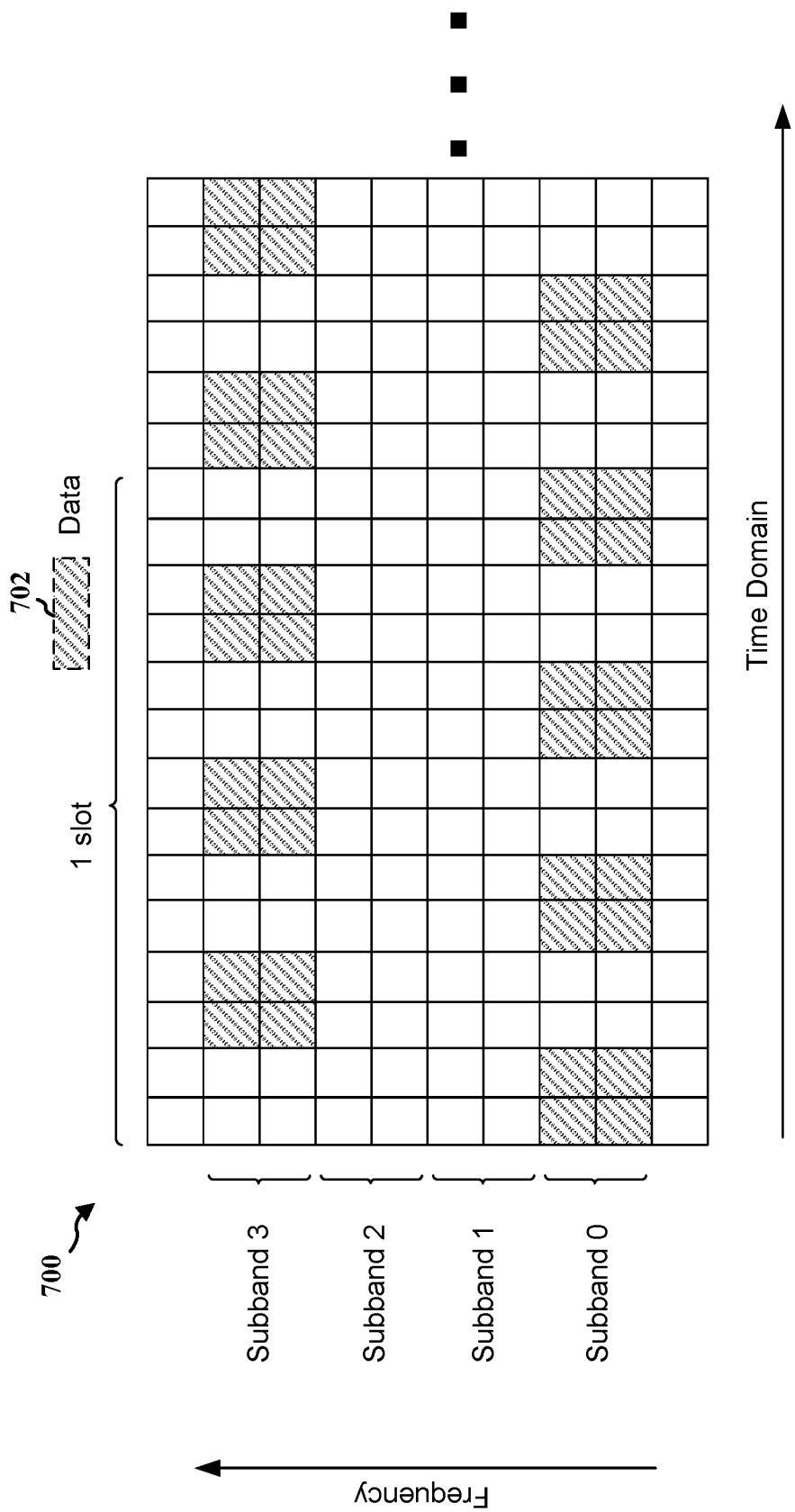
FIG. 7 is a diagram showing example frequency hopping

However, there may be times where the noise at a specific frequency region is particular high which corrupts a data transmission and all its repetitions. Under this scenario, frequency hopping may be utilized. Frequency hopping for a transmission may be similar to the data transmission repetition above except that some of the repetitions may be transmitted over different frequency resources. FIG. 6 is a diagram 600 showing example frequency hopping where a data transmission 602 is being retransmitted using different frequency resources at different times. This may be referred to as inter-slot frequency hopping. By transmitting the same data packet over different frequencies, transmission failure caused by heavy noise at a specific frequency region may be reduced or even avoided. Although FIG. 6 illustrates frequency hopping for different slots, frequency hopping may also occur for different time ranges, e.g., within a subframe. FIG. 7 is a diagram 700 showing another example of frequency hopping where a data packet 702 is being retransmitted at different frequencies (e.g., subband 0 and subband 3) within a slot. This frequency hopping may be referred to as intra-slot frequency hopping. The examples in FIG. 7 merely illustrate two examples of a frequency hopping pattern, and the aspects presented herein may be applied to various frequency hopping patterns.

Figure 8:
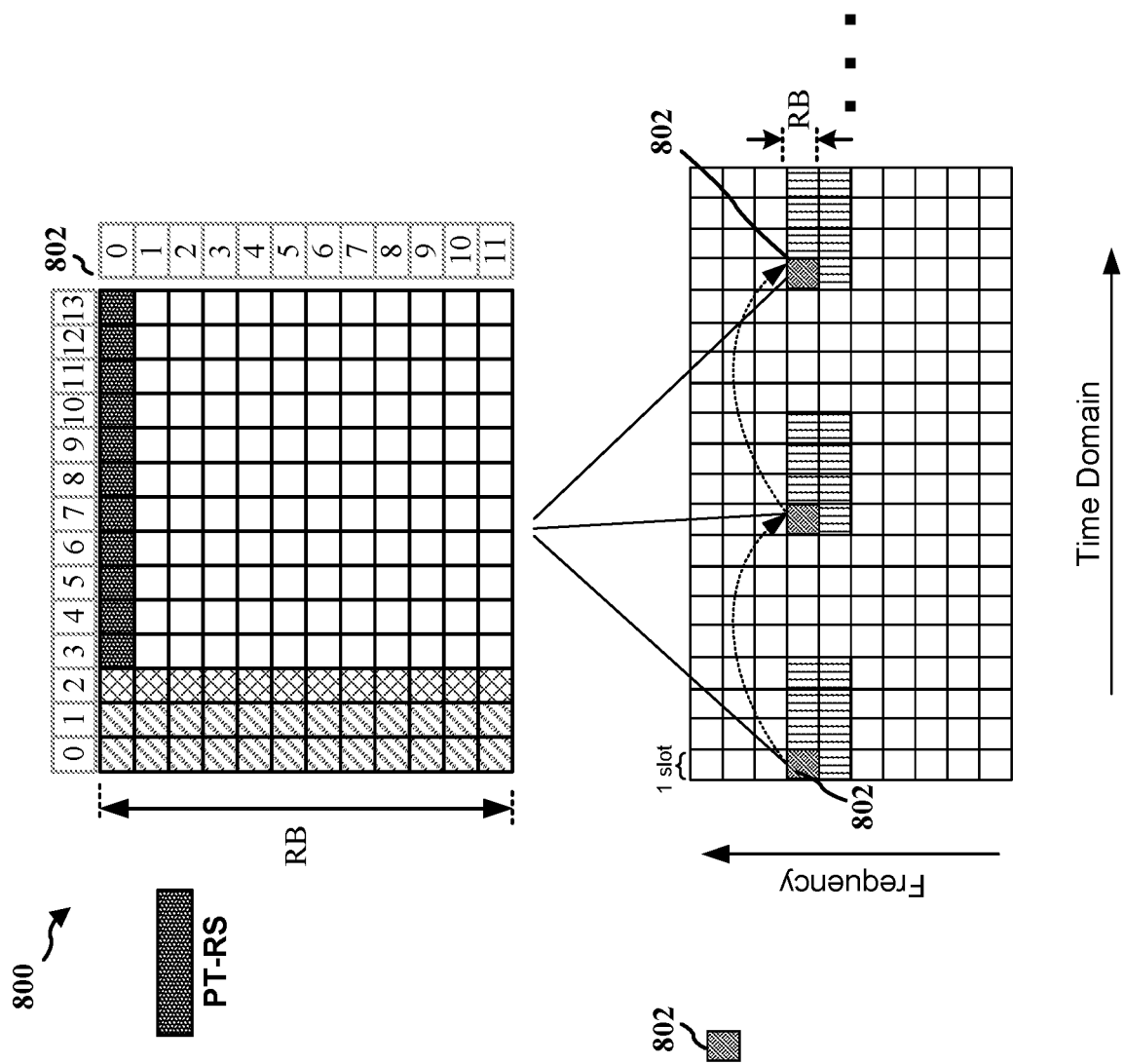
FIG. 8 is a diagram showing an example inter slot repetition involving PT-RS.

FIG. 8 is a diagram 800 showing an example inter slot repetition involving PT-RS. As it can be seen, when a code block 802 with PT-RS is transmitted, all the PT-RS may be repeated in all the retransmissions. In some circumstances, the density of the PT-RS may be reduced for repetitions because more PT-RS are transmitted compared to a single transmission (e.g., a single-slot PDSCH/PUSCH transmission). For example, additional frequency diversity may be achieved if repetition and/or slot specific virtual resource block (VRB)-to-physical resource block (PRB) interleaving is applied to the transmission. In other examples, the phase of the oscillator at transmitter and receiver may have already been tracked using the a first number of retransmissions, and the PT-RS might not be used for later retransmissions. As a result, better throughput performance may be achieved if density configurations for the PT-RS in the time domain and/or the frequency domain further takes into consideration data transmission repetitions.

In some examples, the density of PT-RS for an uplink or downlink transmission may be determined, based on least in part on a number of repetitions for the transmission. For example, the number of repetitions (e.g., inter-slot PDSCH/PUSCH repetitions etc.) may be considered in addition to the scheduled MCS or bandwidth of the transmission, as discussed in connection with Tables 1 and 2.

Table 3 below shows an example table for PT-RS time density, similar to Table 2, in which the time density (e.g., $L_{PT-RS}$) is a function of both scheduled MCS for the transmission (e.g., the PUSCH, PUCCH, PDSCH, or PDCCH) and a number of data transmission repetitions for the transmission. As illustrated, different combinations of scheduled MCS and scheduled number of repetitions, e.g., {MCS, #Rep}, have different time densities. In Table 3, N is the number of scheduled repetitions for the transmission. $N_1$ and $N_2$ correspond to threshold values of repetitions, which may be configured for the UE.

TABLE 3

TD Density ($L_{PT-RS}$) as a function of scheduled MCS

| | No. of Repetitions (#rep) for PDSCH/PUSCH N | | |
|---|---|---|---|
| Scheduled MCS | $N < N_1$ | $N_1 \le N < N_2$ | $N_2 \le N$ |
| $I_{MCS} <$ ptrs-MCS$_1$ | n.p. | n.p. | n.p. |
| ptrs-MCS$_1 \le I_{MCS} <$ ptrs-MCS$_2$ | 4 | 4 | n.p. |
| ptrs-MCS$_2 \le I_{MCS} <$ ptrs-MCS$_3$ | 2 | 2 | 4 |
| ptrs-MCS$_3 \le I_{MCS}$ | 1 | 2 | 2 |

Table 4 below is an example table for PT-RS density based on a number of scheduled repetitions for a transmission (e.g., PDSCH, PUSCH, etc.). As illustrated in Table 4, the scheduled number of repetitions may be used in combination with a scheduled bandwidth for the transmission to determine the frequency density (e.g., $K_{PT-RS}$) for the transmission. For example, different PT-RS frequency domain density levels may be associated with different combinations of scheduled bandwidth and scheduled number repetitions, e.g., {BW, #Rep}. In Table 4, N is the number of scheduled repetitions for the transmission. $N_1$ and $N_2$ correspond to threshold values of repetitions, which may be configured for the UE. $N_{RB}$ corresponds to the scheduled bandwidth, and $N_{RB0}$ and $N_{RB1}$ correspond to threshold bandwidths.

TABLE 4

FD Density ($K_{PT-RS}$) as a function of scheduled bandwidth

| | No. of Repetitions (#rep) for PDSCH/PUSCH N | | |
|---|---|---|---|
| Scheduled BW | $N < N_1$ | $N_1 \le N < N_2$ | $N_2 \le N$ |
| $N_{RB} < N_{RB0}$ | n.p. | n.p. | n.p. |
| $N_{RB0} <= N_{RB} < N_{RB1}$ | 2 | 2 | n.p. |
| $N_{RB1} <= N_{RB}$ | 4 | 2 | 2 |

For each MCS level (e.g., ptrs-MCS$_i$) the time density of the PT-RS may be associated with different repetition levels (denoted as N). Similarly, for each BW level (e.g., $N_{RBi}$), the frequency density of PT-RS may be associated with different repetition levels (denoted as N). Each repetition level may be identified by a number of repetition region as $N<N_1, \ldots N_i, MN<N_1, \ldots, N_k<N$ etc.

There may be multiple ways to associate the PT-RS density configuration with number of repetitions for each MCS or BW level. In some examples, the number of repetitions may be classified into different regions or ranges where each region or range is associated with a PT-RS density. For example, in a particular MCS level, the PT-RS density may be 1 (e.g., 1 PT-RS per symbol) when the scheduled number of repetitions is below a first threshold (e.g., $N_i$), the PT-RS density may be 2 (e.g., 1 PT-RS per 2 symbols) when the scheduled number of repetitions is between the first threshold and a second threshold (e.g., $N_2$), and the PT-RS density may be 4 (e.g., 1 PT-RS per 4 symbols) when the repetition is above the second threshold. Different regions or ranges of repetitions may be associated with the same PT-RS density. For example, repetitions below the first threshold and repetitions between the first threshold and second threshold may both have the same PT-RS density (e.g., 1, 2, 4 etc.). There may also be more than two thresholds (e.g., $N_1, N_2, N_3 \ldots N_k$) with multiple ranges of repetition numbers being defined, e.g., $N<N_1$, $N_1<N<N_2$, $N_2 \le N \le N_3$, $N_3 \le N \le N_4 \ldots N_k \le N$ etc. The use of the number of repetitions to determine a time density for the PT-RS may be applied to uplink and/or downlink transmissions (e.g., PDSCH and/or PUSCH). Different thresholds may be used for PDSCH than for PUSCH. Alternately, at least some of the thresholds may be the same for PDSCH as for PUSCH.

The regions and/or boundaries may be RRC configured for the UE or may be defined and known at the UE and the base station. In some examples, if the base station configures the adjacent repetition thresholds (i.e., $N_i=N_{i+1}$) with the same value, then the identified frequency domain or time domain PT-RS density values associated with the associated repetition level ($N_i \le N < N_{i+1}$) may be considered as disabled. Thus, the base station may indicate that the PT-RS density in time and/or frequency is disabled or not present by configuring the adjacent thresholds with the same value.

Figure 9:
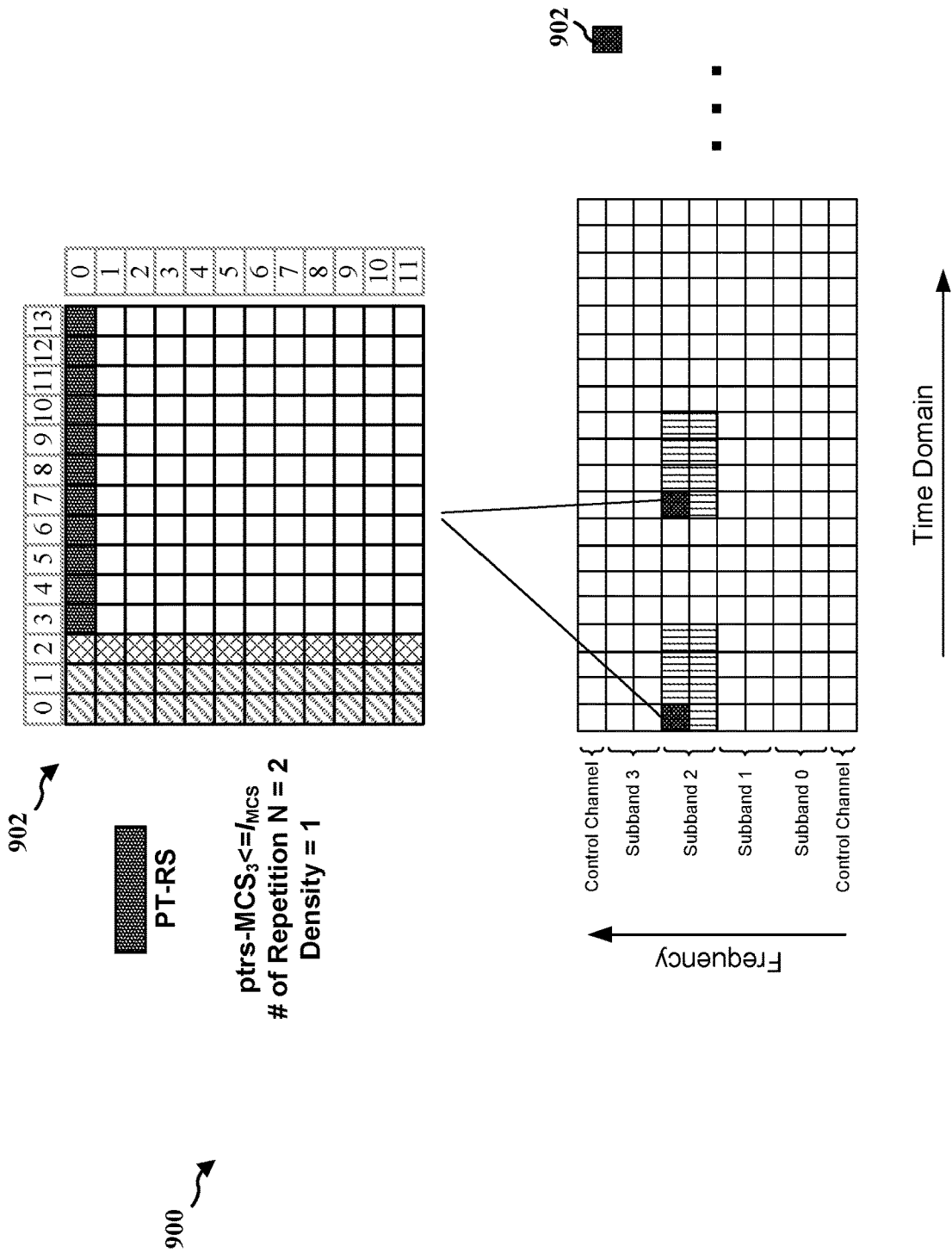
FIG. 9 is a diagram showing an example time domain PT-RS density with repetitions.
Figure 10:
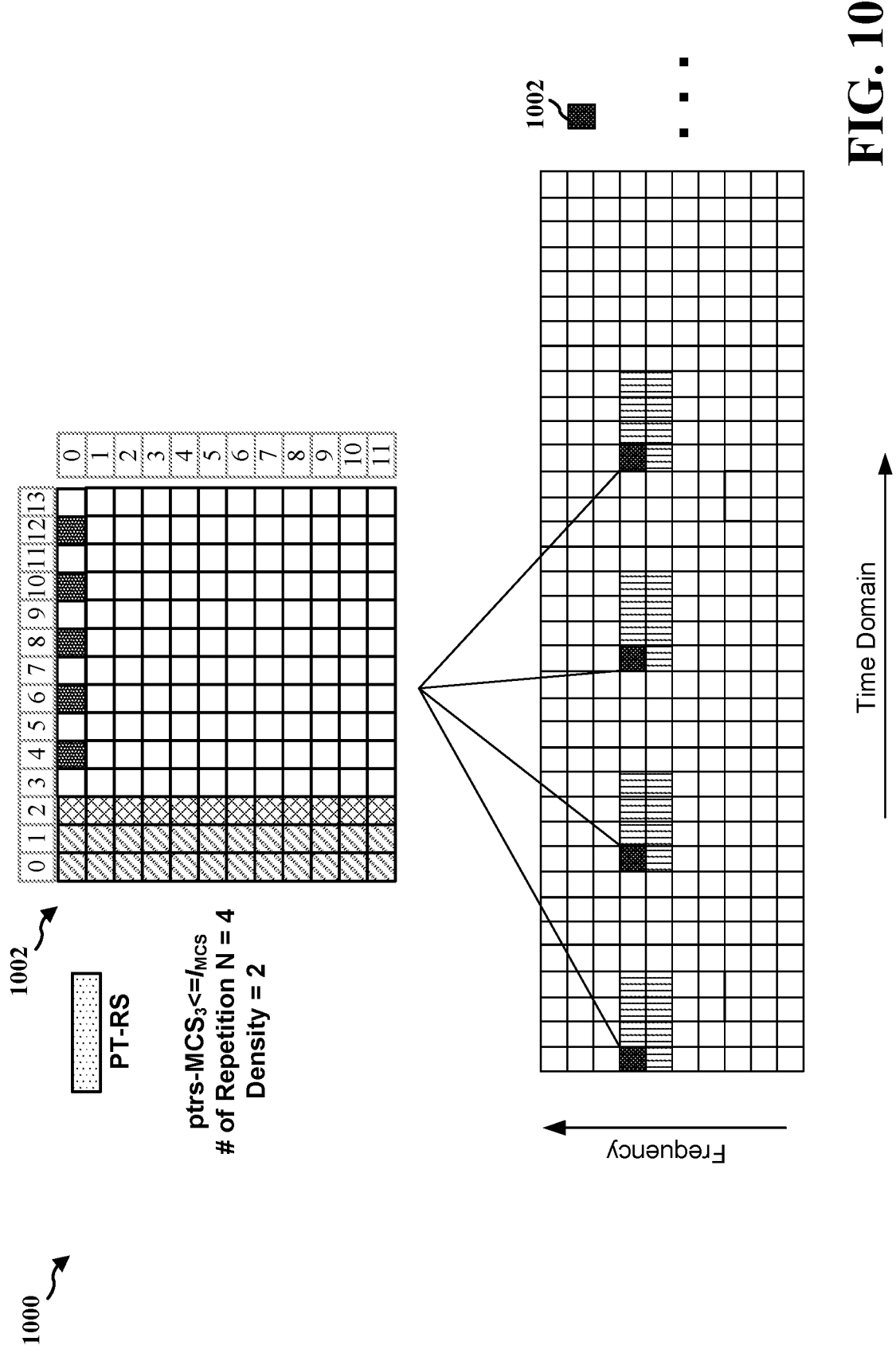
FIG. 10 is a diagram showing an example time domain PT-RS density with repetitions.
Figure 11:
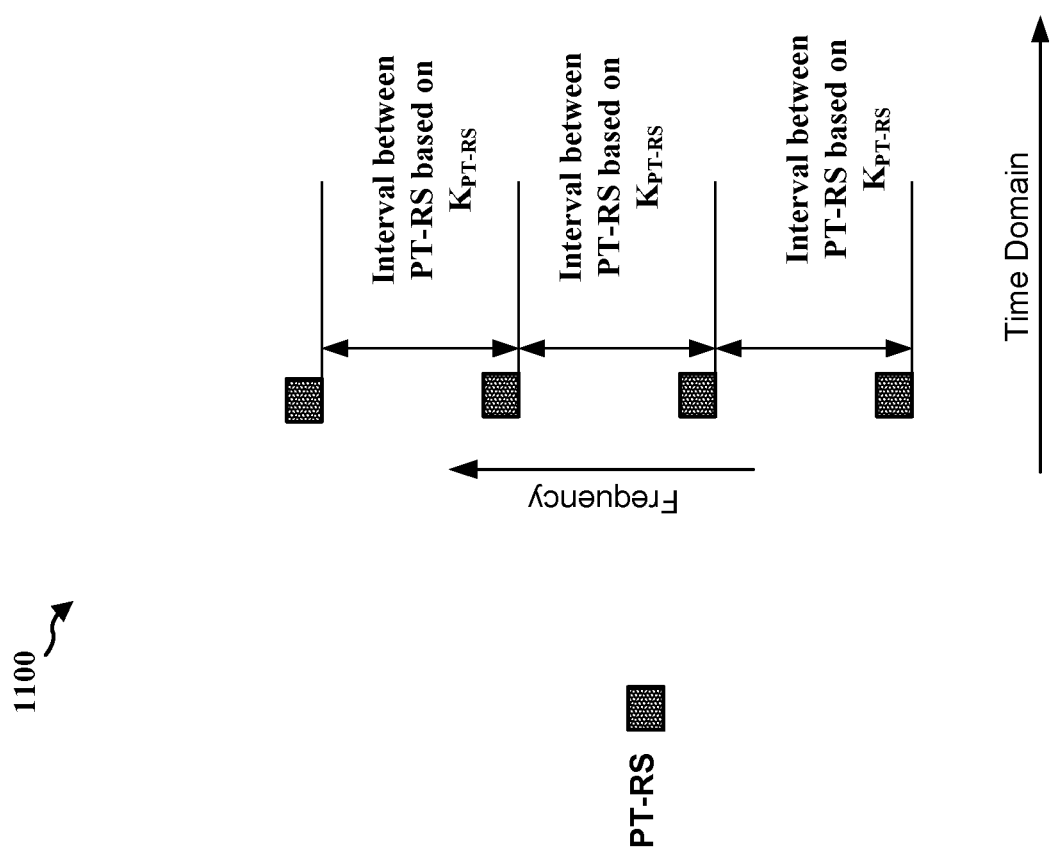
FIG. 11 is a diagram showing an example time domain PT-RS density with repetitions.

FIGS. 9 to 11 are examples showing time domain PT-RS density for different MCS levels and repetitions based on Table 3. In this example, $N_1$ is "2" and $N_2$ is "4." In FIG. 9, as shown by diagram 900, assuming ptrs-MCS$_3$<=$I_{MCS}$, if an uplink or downlink transmission 902 is configured to be repeated two times (e.g., N=2), then the time domain PT-RS density for the transmission is set to 1 based on Table 3 as $N \le N_1$ (e.g., 1 PT-RS per 1 symbol). On the other hand, if the uplink or downlink transmission 1002 is configured to be repeated three times (e.g., N=3) instead, then the time domain PT-RS density for the transmission is set to 2 (e.g., 1 PT-RS per 2 symbols) as shown by diagram 1000 in FIG. 10 because $N_1 \leq N < N_2$.

In FIG. 11 is a diagram 1100 showing an example density of PT-RS in a frequency domain having an interval between PT-RS in the frequency range based on $K_{PT-RS}$, e.g., from Table 3 because $N_2 \leq N$.

In some examples, the density of PT-RS for a uplink or downlink transmission may be configured to depend on the number of transmission repetitions (e.g., PDSCH, PUSCH etc.) without associating or considering MCS or BW levels as shown by Table 5 and Table 6 below. In some examples, the use of such tables may be based on whether repetition is scheduled, or a number of repetitions for the transmission.

TABLE 5

TD Density ($L_{PT-RS}$) based on repetitions

| | No. of Repetitions (#rep) for PDSCH/PUSCH N | | |
|---|---|---|---|
| | $N < N_1$ | $N_1 \leq N < N_2$ | $N_2 \leq N$ |
| TD Density ($L_{PT-RS}$) | 1 | 2 | 4 |

TABLE 6

FD Density ($K_{PT-RS}$) based on repetitions

| | No. of Repetitions (#rep) for PDSCH/PUSCH N | | |
|---|---|---|---|
| | $N < N_1$ | $N_1 \leq N < N_2$ | $N_2 \leq N$ |
| FD Density ($K_{PT-RS}$) | 2 | 4 | 4 |

When repetition is enabled for an uplink or downlink transmission, the modulation order may be restricted to a lower level, such as QPSK, and the time density for the PT-RS may be determined separately from the MCS. For example, the time domain density of the PT-RS may be a function of the frequency domain density of PT-RS such as $L_{PT-RS} = f(K_{PT-RS})$.

In some other examples, the PT-RS density configuration for time domain and/or frequency domain may be based on a defined threshold such that when the number of repetition is above the threshold, the PT-RS may be disabled or not present (e.g., as represented by "n.p.") for the transmission.

TABLE 7

TD Density ($L_{PT-RS}$) as a function of scheduled MCS

| | No. of Repetitions (#rep) for PDSCH/PUSCH N | | |
|---|---|---|---|
| Scheduled MCS | $N < N_1$ | $N_1 \leq N < N_2$ | $N_2 \leq N$ |
| $I_{MCS} <$ ptrs-MCS$_1$ | n.p. | n.p. | n.p. |
| ptrs-MCS$_1 \leq I_{MCS} <$ ptrs-MCS$_2$ | 4 | 4 | n.p. |
| ptrs-MCS$_2 \leq I_{MCS} <$ ptrs-MCS$_3$ | 2 | 2 | n.p. |
| ptrs-MCS$_3 \leq I_{MCS}$ | 1 | 2 | n.p. |

TABLE 8

FD Density ($K_{PT-RS}$) as a function of scheduled bandwidth

| | No. of Repetitions (#rep) for PDSCH/PUSCH N | | |
|---|---|---|---|
| Scheduled BW | $N < N_1$ | $N_1 \leq N < N_2$ | $N_2 \leq N$ |
| $N_{RB} < N_{RB0}$ | n.p. | n.p. | n.p. |
| $N_{RB0} <= N_{RB} < N_{RB1}$ | 2 | 2 | n.p. |
| $N_{RB1} <= N_{RB}$ | 4 | 2 | n.p. |

For example, as shown by Table 7 and 8, the PT-RS density may be configured in a way that when the number of repetition N exceeds a certain threshold, such as defined by $N_2$, the PT-RS density configuration for the transmission may be disabled. For repetitions below the threshold, they may still be assigned to multiple regions (e.g., region 1: $N < N_1$; region 2: $N_1 \leq N < N_2$) with different or same PT-RS density value assigned to each region as shown by the tables. In other examples, PT-RS density below the threshold may simply be assigned to the same PT-RS density such that when the repetition number is above the threshold, PT-RS configuration is disable and when the repetition number is below the threshold, a fixed PT-RS density value is assigned to the transmission (e.g., N<threshold: PT-RS density=2; threshold<N: PT-RS disabled).

When the number of repetition N is above a certain threshold, the scheduled number of resource block(s) for transmission may be limited as the transmission power (e.g., UL-Tx-Power) may be limited, while modulation order may also be limited to QPSK (similar to above example). Thus, PT-RS may be completely disabled when the repetition is above the threshold for both time domain and frequency domain.

Figure 12:
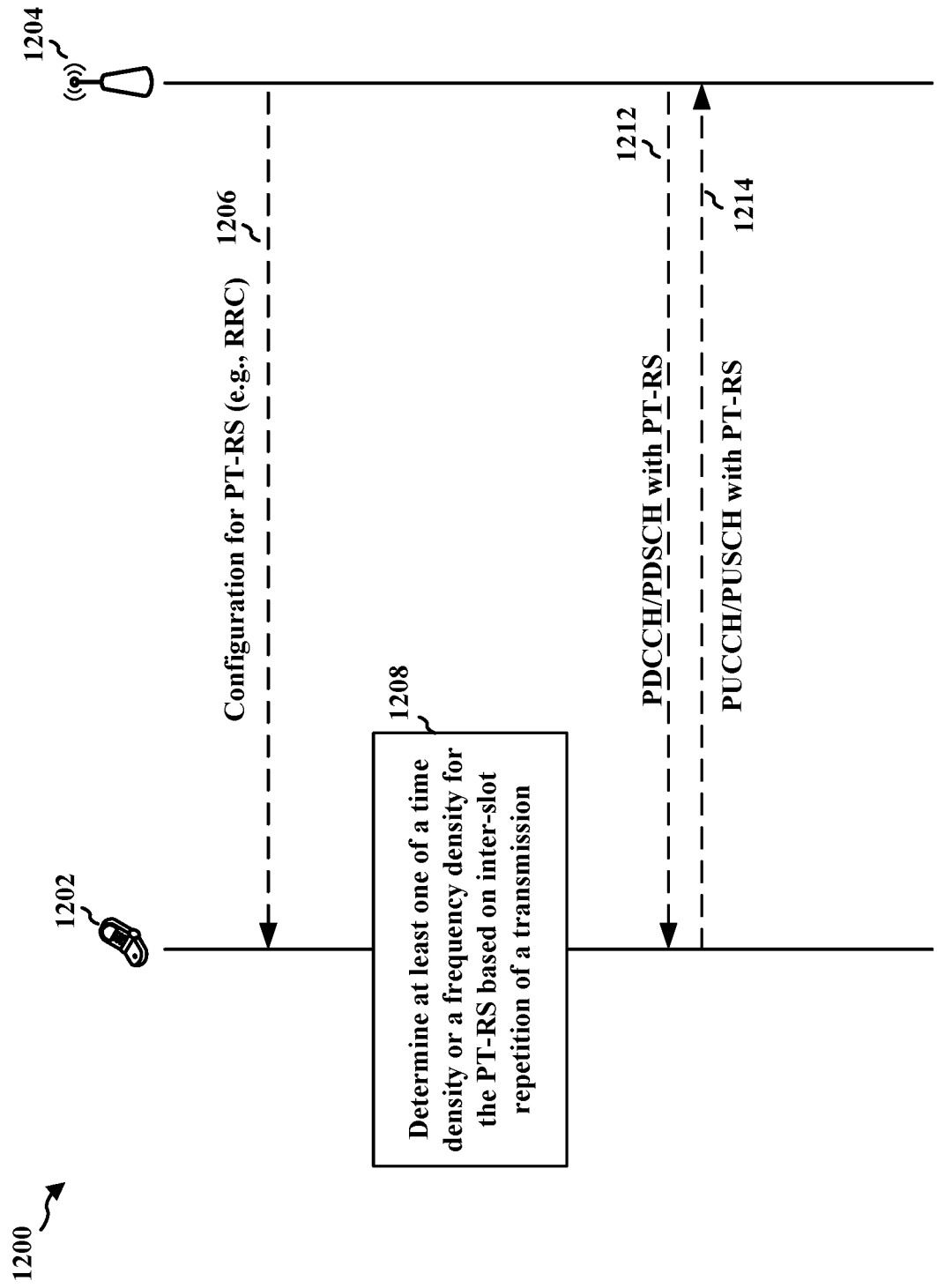
FIG. 12 is an example communication flow between a UE and a base station.

FIG. 12 illustrates an example communication flow 1200 between a UE 1202 and a base station 1204 that includes the UE 1202 receiving a configuration 1206 for a PT-RS. The configuration 1206 for the PT-RS may be received in RRC signaling and includes one or more parameters, such as a first parameter for the first threshold number of repetitions (e.g., $N_1$) or a second parameter for the second threshold number of repetitions (e.g., $N_2$).

At 1208, based on the configuration 1206, the UE 1202 may determine at least one of a time density or a frequency density for the PT-RS based on inter-slot repetition of a transmission. For example, when the transmission comprises a PDSCH, the UE 1202 may receive the PT-RS using the at least one of the time density or the frequency density. When the transmission comprises a PUSCH, the UE may transmit the PT-RS using a same or a different time density or different frequency density.

For example, the UE 1202 may determine the time density for the PT-RS based on the number of inter-slot repetitions of the transmission, e.g., as described in connection with Tables 3, 5, or 7. The UE 1202 may also determine the time density for the PT-RS further based on a MCS for the transmission, where for a MCS level different time densities are associated with different repetition levels. Similarly, the UE 1202 may determine the frequency density for the PT-RS based on the number of inter-slot repetitions of the transmission, e.g., as described in connection with Tables 4, 6, or 8. The UE 1202 may also determine the frequency density for the PT-RS further based on a bandwidth for the transmission, wherein for a bandwidth level different frequency densities are associated with different repetition levels, e.g., as described in connection with Table 4.

In some examples, the UE 1202 may determine the at least one of the time density or the frequency density for the PT-RS based on whether the transmission comprises a first number of inter-slot repetitions that meets one or more of a first number of repetitions (e.g., $N_1$) or a second number of repetitions (e.g., $N_2$). If the $N_1=N_2$, the UE 1202 may determine that the time density or the frequency density for the PT-RS is not present. $N_1$ and/or $N_2$ may be configured for the UE, e.g., in RRC signaling, or may be defined and known to the UE 1202.

In other examples, if the inter-slot repetition is not enabled for the transmission, the time density for the PT-RS may be determined based on a MCS of the transmission, and if the inter-slot repetition is enabled for the transmission, the time density for the PT-RS may not be determined based on the MC S of the transmission. If the inter-slot repetition is enabled, the time density for the PT-RS may be based on the frequency density for the PT-RS. In some other examples, the PT-RS may be disabled when a number of repetitions is above a threshold. This may apply when the transmission comprises a PUSCH.

At 1212, after the UE 1202 determines at least one of a time density or a frequency density for the PT-RS based on inter-slot repetition of a transmission, the UE 1202 may receive PDSCH or PDCCH having the PT-RS based on the at least one of the time density or the frequency density determined based on the inter-slot repetition of the transmission. At 1214, after the UE 1202 determines at least one of a time density or a frequency density for the PT-RS based on inter-slot repetition of a transmission, the UE 1202 may transmit PUSCH or PUCCH having the PT-RS based on the at least one of the time density or the frequency density determined based on the inter-slot repetition of the transmission.

Figure 13:
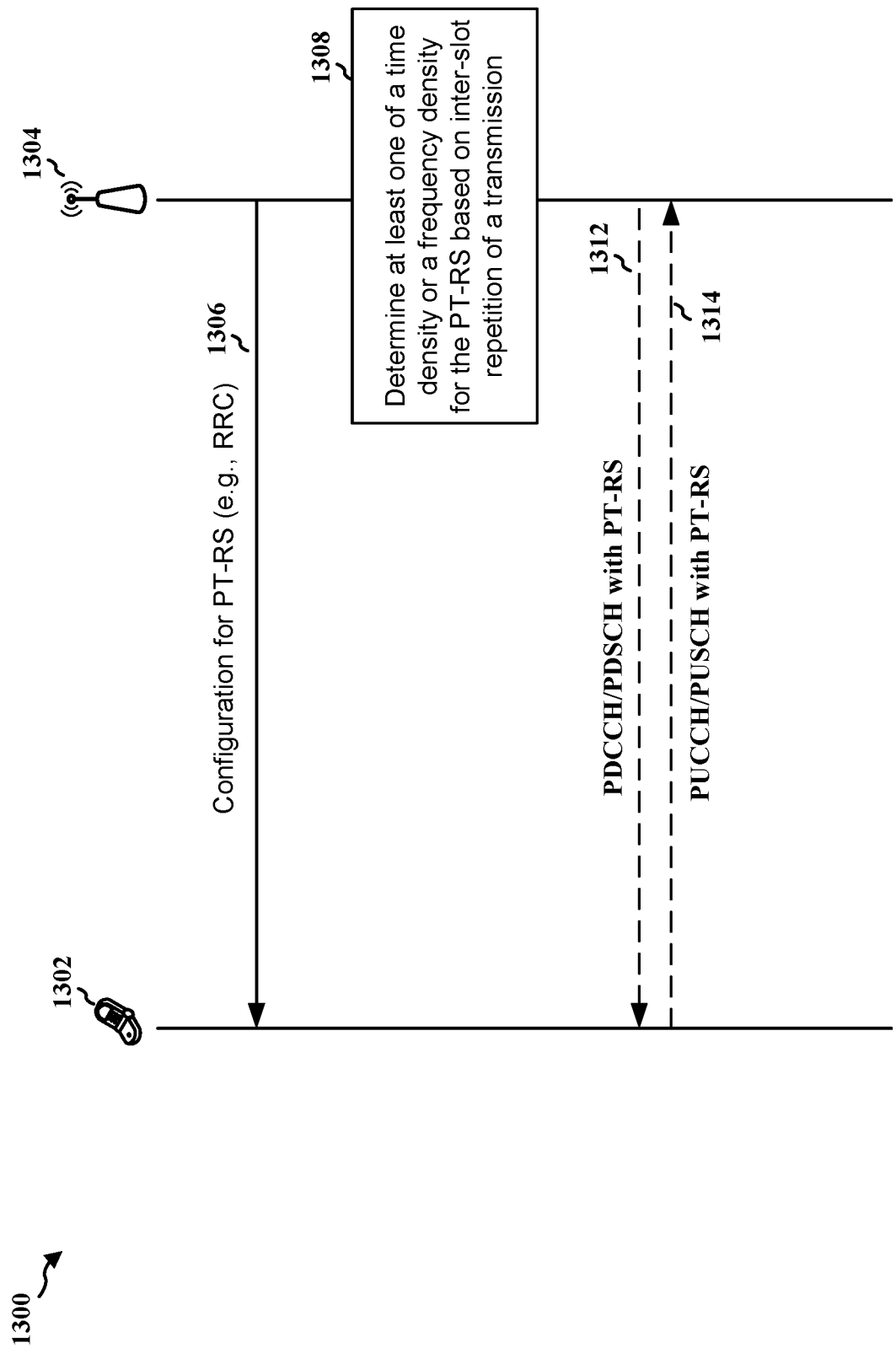
FIG. 13 is an example communication flow between a UE and a base station.

FIG. 13 illustrates another example communication flow 1300 between a base station 1304 and a UE 1302 that includes the base station 1304 determining a PT-RS density in time and/or frequency for the UE. At 1306, the base station 1304 configures the UE 1302 for a PT-RS. The configuration 1306 for the PT-RS may be transmitted in RRC signaling and may include one or more of a first parameter for a first threshold number of repetitions (e.g., $N_1$) or a second number of repetitions (e.g., $N_2$).

At 1308, based on the configuration 1306, base station 1304 may determine at least one of a time density or a frequency density for the PT-RS based on inter-slot repetition of a transmission. For example, when the transmission comprises a PDSCH 1312, the base station may transmits the PT-RS using the at least one of the time density or the frequency density. When the transmission comprises a PUSCH 1314, and the base station may receive the PT-RS using the at least one of the time density or the frequency density.

For example, the base station 1304 may determine the time density for the PT-RS based on the inter-slot repetition of the transmission, e.g., as described in connection with Tables 3, 5, or 7. The base station 1304 may also determine the time density for the PT-RS further based on a MCS for the transmission, where for a MCS level different time densities are associated with different repetition levels. Similarly, the base station 1304 may determine the frequency density for the PT-RS based on the inter-slot repetition of the transmission, e.g., as described in connection with Tables 4, 6, or 8. The base station 1304 may also determine the frequency density for the PT-RS further based on a bandwidth for the transmission, wherein for a bandwidth level different frequency densities are associated with different repetition levels.

In some examples, base station 1304 may determine the at least one of the time density or the frequency density based on whether the transmission comprises a first number of inter-slot repetitions that meets one or more of a first threshold number of repetitions (e.g., $N_1$) or a second threshold number of repetitions (e.g., $N_2$). The base station 1304 may indicate that the time density and/or the frequency density for the PT-RS is not present by configuring the first threshold number of repetitions equal to the second threshold number of repetitions, e.g., $N_1=N_2$. Rather than being configured, $N_1$ and/or $N_2$ may be defined.

In other examples, if the inter-slot repetition is not enabled for the transmission, the time density for the PT-RS may be determined based on a MCS of the transmission, and if the inter-slot repetition is enabled for the transmission, the time density for the PT-RS may not be determined based on the MC S of the transmission. If the inter-slot repetition is enabled, the time density for the PT-RS may be based on the frequency density for the PT-RS. In some other examples, the PT-RS may be disabled when a number of repetitions is above a threshold. This may apply when the transmission comprises a PUSCH.

At 1312, after base station 1304 determines at least one of a time density or a frequency density for the PT-RS based on inter-slot repetition of a transmission, base station 1304 may transmit the PT-RS, e.g., in a PDSCH or PDCCH, based on the at least one of the time density or the frequency density determined based on the inter-slot repetition of the transmission.

At 1314, after base station 1304 determines at least one of a time density or a frequency density for the PT-RS based on inter-slot repetition of a transmission, base station 1304 may receive the PT-RS, e.g., in a PUSCH or PUCCH, based on the at least one of the time density or the frequency density determined based on the inter-slot repetition of the transmission.

Figure 14:
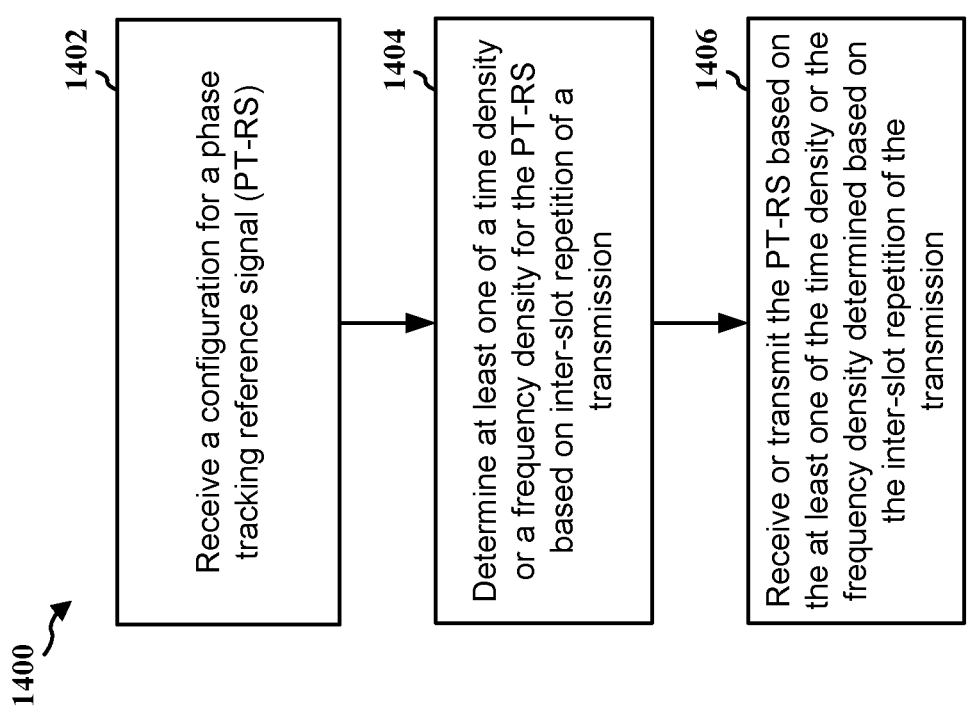
FIG. 14 is a flowchart of a method of wireless communication.

FIG. 14 is a flowchart of a method 1400 of wireless communication. The method may be performed by a UE or a component of a UE (e.g., the UE 104, 350, 1202, 1302; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to determine PT-RS density for a transmission based, at least in part, on the number of inter-slot repetitions.

At 1402, the UE may receive a configuration for a PT-RS. The configuration for the PT-RS may be received in RRC signaling. The configuration may include one or more of a first parameter for the first number of repetitions or a second parameter for the second number of repetitions. The parameters may correspond to $N_1$ and/or $N_2$, as described in connection with any of Tables 3-8.

At 1404, based on the received configuration, the UE may determine at least one of a time density or a frequency density for the PT-RS based on inter-slot repetition of a transmission, e.g., as described in connection with any of Tables 3-8 or FIG. 12 or 13.

For example, the UE may determine the time density for the PT-RS based on the inter-slot repetition of the transmission, e.g., as described in connection with any of FIGS. 5-10 and any of Tables 3, 5, or 7. The UE may also determine the time density for the PT-RS further based on a MCS for the transmission, where for a MCS level different time densities are associated with different repetition levels, e.g., as described in connection with Table 3. Similarly, the UE may determine the frequency density for the PT-RS based on the inter-slot repetition of the transmission, e.g., as described in connection with FIG. 11 and any of Tables 4, 6, or 8. The UE may also determine the frequency density for the PT-RS further based on a bandwidth for the transmission, wherein for a bandwidth level different frequency densities are associated with different repetition levels, e.g., as described in connection with Table 4.

In some examples, the UE may determine the at least one of the time density or the frequency density based on whether the transmission comprises a first number of inter-slot repetitions that meets one or more of a first number of repetitions or a second number of repetitions (e.g., $N_1$ and/or $N_2$). If the configuration configures the first number of repetitions equal to the second number of repetitions (e.g., $N_1=N_2$), the UE may determine that the time density or the frequency density for the PT-RS is not present. Alternately or additionally, the one or more of the first number of repetitions or the second number of repetitions may be defined.

In other examples, if the inter-slot repetition is not enabled for the transmission, the time density for the PT-RS may be determined based on a MCS of the transmission, and if the inter-slot repetition is enabled for the transmission, the time density for the PT-RS may not be determined based on the MCS of the transmission. If the inter-slot repetition is enabled, the time density for the PT-RS may be based on the frequency density for the PT-RS. In some other examples, the PT-RS may be disabled when a number of repetitions is above a threshold. This may apply when the transmission comprises a PUSCH.

At 1406, after the UE determines at least one of a time density or a frequency density for the PT-RS based on inter-slot repetition of a transmission, the UE may receive or transmit the PT-RS based on the at least one of the time density or the frequency density determined based on the inter-slot repetition of the transmission. For example, when the transmission comprises a PDSCH, the UE may receive the PT-RS using the at least one of the time density or the frequency density. When the transmission comprises a PUSCH, the UE may transmit the PT-RS using the at least one of the time density or the frequency density.

Each block in the aforementioned flowchart of FIG. 14 and aspects performed by the UE 1202, 1302 in FIGS. 12 and 13 may be performed by at least one component of a wireless apparatus, each component being one or more hardware components specifically configured to carry out the stated processes/algorithm, implemented by a processor configured to perform the stated processes/algorithm, stored within a computer-readable medium for implementation by a processor, or some combination thereof.

The components may be software components running in a processor, resident/stored in the computer readable medium/memory, one or more hardware components coupled to the processor, or some combination thereof. The processing system may be a component of the UE 350 and may include the memory 360 and/or at least one of the TX processor 368, the RX processor 356, and the controller/processor 359. Alternatively, the processing system may be the entire UE (e.g., see 350 of FIG. 3).

In one configuration, an apparatus for wireless communication at UE may include means for receiving a configuration for a PT-RS; means for determining at least one of a time density or a frequency density for the PT-RS based on inter-slot repetition of a transmission; and means for receiving or transmitting the PT-RS based on the at least one of the time density or the frequency density determined based on the inter-slot repetition of the transmission, e.g., as described in connection with FIG. 14. The aforementioned means may be one or more of the aforementioned components of the apparatus and/or the processing system of the apparatus may be configured to perform the functions recited by the aforementioned means. The processing system may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
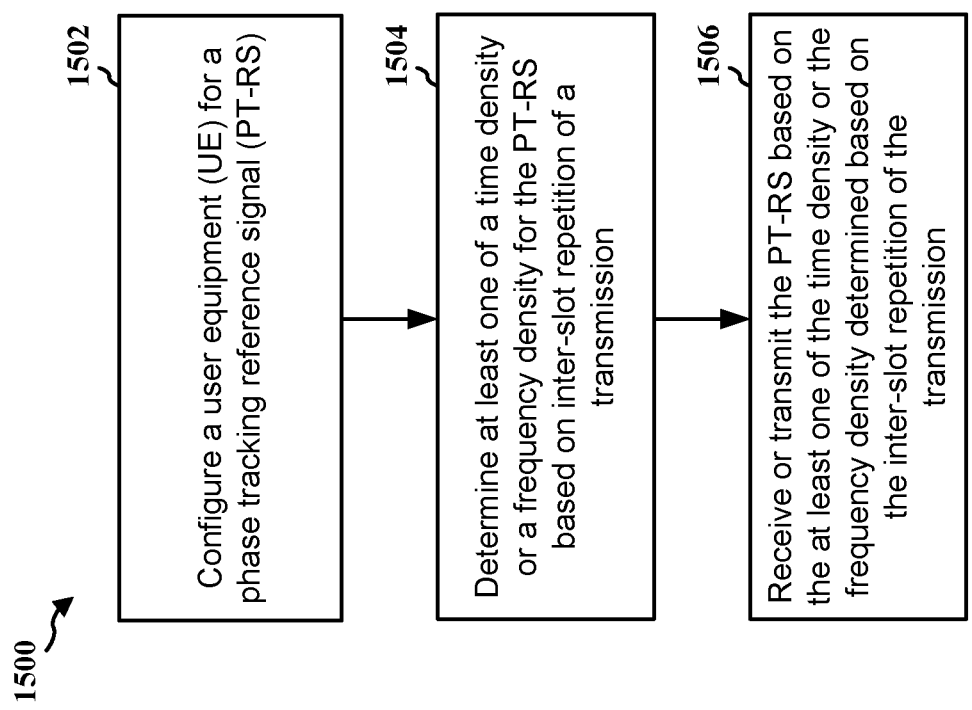
FIG. 15 is a flowchart of a method of wireless communication.

FIG. 15 is a flowchart of a method 1500 of wireless communication. The method may be performed by a base station or a component of a base station (e.g., the base station 102, 180, 310, 1204, 1304; the processing system, which may include the memory 376 and which may be the entire base station 310 or a component of the base station 310, such as the TX processor 316, the RX processor 370, and/or the controller/processor 375). Optional aspects are illustrated with a dashed line. The method may enables the base station to determine the PT-RS density in time and/or frequency of a transmission based in part on the number of inter-slot repetitions.

At 1502, the base station may configure a UE for a PT-RS. The configuration for the PT-RS may be transmitted in RRC signaling and may include one or more of a first parameter for the first number of repetitions or a second parameter for the second number of repetitions (e.g., $N_1$ and/or $N_2$).

At 1504, the base station may determine at least one of a time density or a frequency density for the PT-RS based on inter-slot repetition of a transmission, e.g., as described in connection with any of Tables 3-8 or FIG. 12 or 13.

For example, the base station may determine the time density for the PT-RS based on the inter-slot repetition of the transmission, e.g., as described in connection with Table 3, Table 5, Table 7 and/or any of FIGS. 5-10. The base station may also determine the time density for the PT-RS further based on a MCS for the transmission, where for a MCS level different time densities are associated with different repetition levels, e.g., as described in connection with Table 3. Similarly, the base station may determine the frequency density for the PT-RS based on the inter-slot repetition of the transmission, e.g., as described in connection with Table 4, Table 6, Table 8, and/or FIG. 11. The base station may also determine the frequency density for the PT-RS further based on a bandwidth for the transmission, wherein for a bandwidth level different frequency densities are associated with different repetition levels, e.g., as described in connection with Table 4.

In some examples, the base station may determine the at least one of the time density or the frequency density based on whether the transmission comprises a first number of inter-slot repetitions that meets one or more of a first number of repetitions or a second number of repetitions. The base station may indicate that the time density or the frequency density for the PT-RS is not present by configuring the first number of repetitions equal to the second number of repetitions. Also, the one or more of the first number of repetitions or the second number of repetitions may be defined.

In other examples, if the inter-slot repetition is not enabled for the transmission, the time density for the PT-RS may be determined based on a MCS of the transmission, and if the inter-slot repetition is enabled for the transmission, the time density for the PT-RS may not be determined based on the MCS of the transmission. If the inter-slot repetition is enabled, the time density for the PT-RS may be based on the frequency density for the PT-RS. In some other examples, the PT-RS may be disabled when a number of repetitions is above a threshold. This may apply when the transmission comprises a PUSCH.

At 1506, after the base station determines at least one of a time density or a frequency density for the PT-RS based on inter-slot repetition of a transmission, the base station may receive or transmit the PT-RS based on the at least one of the time density or the frequency density determined based on the inter-slot repetition of the transmission. For example, when the transmission comprises a PDSCH, the base station may transmit the PT-RS using the at least one of the time density or the frequency density. When the transmission comprises a PUSCH, and the base station may receive the PT-RS using the at least one of the time density or the frequency density.

Each block in the aforementioned flowchart of FIG. 15 and aspects performed by the base station 1204, 1304 in FIGS. 12 and 13 may be performed by at least one component of a wireless apparatus, each component being one or more hardware components specifically configured to carry out the stated processes/algorithm, implemented by a processor configured to perform the stated processes/algorithm, stored within a computer-readable medium for implementation by a processor, or some combination thereof.

The components may be software components running in a processor, resident/stored in the computer readable medium/memory, one or more hardware components coupled to the processor, or some combination thereof. The system may be a component of the base station 310 and may include the memory 376 and/or at least one of the TX processor 316, the RX processor 370, and the controller/processor 375. Alternatively, the processing system may be the entire base station (e.g., see 310 of FIG. 3).

In one configuration, an apparatus for wireless communication at a base station may include means for configuring a user equipment (UE) for a phase tracking reference signal (PT-RS); means for determining at least one of a time density or a frequency density for the PT-RS based on inter-slot repetition of a transmission; and means for receiving or transmitting the PT-RS based on the at least one of the time density or the frequency density determined based on the inter-slot repetition of the transmission, e.g., as described in connection with FIG. 15. The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other embodiments or teaching described herein, without limitation.

Example 1 is a method of wireless communication at a UE, comprising: receiving a configuration for a PT-RS; determining at least one of a time density or a frequency density for the PT-RS based on inter-slot repetition of a transmission; and receiving or transmitting the PT-RS based on the at least one of the time density or the frequency density determined based on the inter-slot repetition of the transmission.

In Example 2, the method of Example 1 further includes that the transmission comprises a PDSCH, and the UE receives the PT-RS using the at least one of the time density or the frequency density.

In Example 3, the method of Example 1 or Example 2 further includes that the transmission comprises a PUSCH, and the UE transmits the PT-RS using the at least one of the time density or the frequency density.

In Example 4, the method of any of Examples 1-3 further includes that the UE determines the time density for the PT-RS based on the inter-slot repetition of the transmission.

In Example 5, the method of any of Examples 1-4 further includes that the UE determines the time density for the PT-RS further based on a MCS for the transmission, wherein for a MCS level different time densities are associated with different repetition levels.

In Example 6, the method of any of Examples 1-5 further includes that the frequency density for the PT-RS based on the inter-slot repetition of the transmission.

In Example 7, the method of any of Examples 1-6 further includes that the frequency density for the PT-RS further based on a bandwidth for the transmission, wherein for a bandwidth level different frequency densities are associated with different repetition levels.

In Example 8, the method of any of Examples 1-7 further includes that the UE determines the time density and the frequency density for the PT-RS based on the inter-slot repetition of the transmission.

In Example 9, the method of any of Examples 1-8 further includes that the UE determines the at least one of the time density or the frequency density based on whether the transmission comprises a first number of inter-slot repetitions that meets one or more of a first number of repetitions or a second number of repetitions.

In Example 10, the method of any of Examples 1-9 further includes that the PT-RS is received in RRC signaling and includes one or more of a first parameter for the first number of repetitions or a second parameter for the second number of repetitions.

In Example 11, the method of any of Examples 1-10 further includes that if the configuration configures the first number of repetitions equal to the second number of repetitions, the UE determines that the time density or the frequency density for the PT-RS is not present.

In Example 12, the method of any of Examples 1-11 further includes that the one or more of the first number of repetitions or the second number of repetitions is defined.

In Example 13, the method of any of Examples 1-12 further includes that if the inter-slot repetition is not enabled for the transmission, the time density for the PT-RS is determined based on a MCS of the transmission, and if the inter-slot repetition is enabled for the transmission, the time density for the PT-RS is not determined based on the MCS of the transmission.

In Example 14, the method of any of Examples 1-13 further includes that if the inter-slot repetition is enabled, the time density for the PT-RS is based on the frequency density for the PT-RS.

In Example 15, the method of any of Examples 1-14 further includes that the PT-RS is disabled when a number of repetitions is above a threshold.

In Example 16, the method of any of Examples 1-15 further includes that the transmission comprises a PUSCH.

Example 17 is an apparatus for wireless communication at a UE, comprising: means for receiving a configuration for a PT-RS; means for determining at least one of a time density or a frequency density for the PT-RS based on inter-slot repetition of a transmission; and means for receiving or transmitting the PT-RS based on the at least one of the time density or the frequency density determined based on the inter-slot repetition of the transmission.

In Example 18, the apparatus of Example 17 further includes means to perform the method of any of Examples 2-16.

Example 19 is an apparatus for wireless communication at a UE, comprising: a memory; and at least one processor coupled to the memory and configured to perform the method of any of Examples 1-16.

Example 20 is a computer-readable medium storing computer executable code for wireless communication at a UE, the code when executed by a processor cause the processor to perform the method of any of Examples 1-16.

Example 21 is method of wireless communication at a base station, comprising: configuring a UE for a PT-RS; determining at least one of a time density or a frequency density for the PT-RS based on inter-slot repetition of a transmission; and receiving or transmitting the PT-RS based on the at least one of the time density or the frequency density determined based on the inter-slot repetition of the transmission.

In Example 22, the method of Example 21 further includes that the transmission comprises a PDSCH, and the base station transmits the PT-RS using the at least one of the time density or the frequency density.

In Example 23, the method of Example 21 or Example 22 further includes that the transmission comprises a PUSCH, and the base station receives the PT-RS using the at least one of the time density or the frequency density.

In Example 24, the method of any of Examples 21-23 further includes that the base station determines the time density for the PT-RS based on the inter-slot repetition of the transmission.

In Example 25, the method of any of Examples 21-24 further includes that the base station determines the time density for the PT-RS further based on a MCS for the transmission, wherein for a MCS level different time densities are associated with different repetition levels.

In Example 26, the method of any of Examples 21-25 further includes that the base station determines the frequency density for the PT-RS based on the inter-slot repetition of the transmission.

In Example 27, the method of any of Examples 21-26 further includes that the base station determines the frequency density for the PT-RS further based on a bandwidth for the transmission, wherein for a bandwidth level different frequency densities are associated with different repetition levels.

In Example 28, the method of any of Examples 21-27 further includes that the base station determines the time density and the frequency density for the PT-RS based on the inter-slot repetition of the transmission.

In Example 29, the method of any of Examples 21-28 further includes that the base station determines the at least one of the time density or the frequency density based on whether the transmission comprises a first number of inter-slot repetitions that meets one or more of a first number of repetitions or a second number of repetitions.

In Example 30, the method of any of Examples 21-29 further includes that the base station configures the UE for the PT-RS in RRC signaling and configures one or more of a first parameter for the first number of repetitions or a second parameter for the second number of repetitions.

In Example 31, the method of any of Examples 21-32 further includes that the base station indicates that the time density or the frequency density for the PT-RS is not present by configuring the first number of repetitions equal to the second number of repetitions.

In Example 32, the method of any of Examples 21-31 further includes that the one or more of the first number of repetitions or the second number of repetitions is defined.

In Example 33, the method of any of Examples 21-32 further includes that if the inter-slot repetition is not enabled for the transmission, the time density for the PT-RS is determined based on a MCS of the transmission, and if the inter-slot repetition is enabled for the transmission, the time density for the PT-RS is not determined based on the MCS of the transmission.

In Example 34, the method of any of Examples 21-33 further includes that if the inter-slot repetition is enabled, the time density for the PT-RS is based on the frequency density for the PT-RS.

In Example 35, the method of any of Examples 21-34 further includes that the PT-RS is disabled when a number of repetitions is above a threshold.

In Example 36, the method of any of Examples 21-35 further includes that the transmission comprises a PUSCH.

Example 37 is an apparatus for wireless communication at a base station, comprising: means for configuring a UE for a PT-RS; means for determining at least one of a time density or a frequency density for the PT-RS based on inter-slot repetition of a transmission; and means for receiving or transmitting the PT-RS based on the at least one of the time density or the frequency density determined based on the inter-slot repetition of the transmission.

In Example 38, the apparatus of Example 37 further includes means to perform the method of any of Examples 22-36.

Example 39 is an apparatus for wireless communication at a base station, comprising: a memory; and at least one processor coupled to the memory and configured to perform the method of any of Examples 21-36.

Example 40 is a computer-readable medium storing computer executable code for wireless communication at a base station, the code when executed by a processor cause the processor to perform the method of any of Examples 21-36.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
   memory; and
   one or more processors coupled to the memory and configured to cause the UE to:
   receive a configuration for a phase tracking reference signal (PT-RS);
   determine at least one of a time density or a frequency density for the PT-RS based on inter-slot repetition of a transmission; and
   receive or transmit the PT-RS based on the at least one of the time density or the frequency density determined based on the inter-slot repetition of the transmission.

2. The apparatus of claim 1, wherein the transmission comprises a physical downlink shared channel (PDSCH), and wherein the one or more processors are configured to cause the UE to receive the PT-RS using the at least one of the time density or the frequency density.

3. The apparatus of claim 1, wherein the transmission comprises a physical uplink shared channel (PUSCH), and wherein the one or more processors are configured to cause the UE to transmit the PT-RS using the at least one of the time density or the frequency density.

4. The apparatus of claim 1, wherein the one or more processors are configured to cause the UE to determine the time density for the PT-RS based on the inter-slot repetition of the transmission.

5. The apparatus of claim 4, wherein the one or more processors are configured to cause the UE to determine the time density for the PT-RS further based on a modulation and coding scheme (MCS) for the transmission, wherein for a MCS level different time densities are associated with different repetition levels.

6. The apparatus of claim 1, wherein the one or more processors are configured to cause the UE to determine the frequency density for the PT-RS based on the inter-slot repetition of the transmission.

7. The apparatus of claim 6, wherein the one or more processors are configured to cause the UE to determine the frequency density for the PT-RS further based on a bandwidth for the transmission, wherein for a bandwidth level different frequency densities are associated with different repetition levels.

8. The apparatus of claim 1, wherein the one or more processors are configured to cause the UE to determine the time density and the frequency density for the PT-RS based on the inter-slot repetition of the transmission.

9. The apparatus of claim 1, wherein the one or more processors are configured to cause the UE to determine the at least one of the time density or the frequency density based on whether the transmission comprises a first number of inter-slot repetitions that meets one or more of a first number of repetitions or a second number of repetitions.

10. The apparatus of claim 9, wherein the one or more processors are configured to cause the UE to receive the configuration for the PT-RS in radio resource control (RRC) signaling that includes one or more of a first parameter for the first number of repetitions or a second parameter for the second number of repetitions.

11. The apparatus of claim 10, wherein the one or more processors are configured to cause the UE to determine that the time density or the frequency density for the PT-RS is not present if the configuration configures the first number of repetitions equal to the second number of repetitions.

12. The apparatus of claim 9, wherein one or more of the first number of repetitions or the second number of repetitions is defined.

13. The apparatus of claim 1, wherein the one or more processors are configured to cause the UE to:
   determine the time density for the PT-RS based on a modulation and coding scheme (MCS) of the transmission if the inter-slot repetition is not enabled for the transmission, and
   determine the time density for the PT-RS not based on the MCS of the transmission if the inter-slot repetition is enabled for the transmission.

14. The apparatus of claim 13, wherein the one or more processors are configured to cause the UE to determine the time density for the PT-RS based on the frequency density for the PT-RS if the inter-slot repetition is enabled.

15. The apparatus of claim 1, wherein the PT-RS is disabled when a number of repetitions is above a threshold.

16. The apparatus of claim 15, wherein the transmission comprises a physical uplink shared channel (PUSCH).

17. An apparatus for method wireless communication at a base station, comprising:
   memory; and
   one or more processors coupled to the memory and configured to cause the UE to:
   configure a user equipment (UE) for a phase tracking reference signal (PT-RS);
   determine at least one of a time density or a frequency density for the PT-RS based on inter-slot repetition of a transmission; and
   receive or transmit the PT-RS based on the at least one of the time density or the frequency density determined based on the inter-slot repetition of the transmission.

18. The apparatus of claim 17, wherein the transmission comprises a physical downlink shared channel (PDSCH), and wherein the one or more processors are configured to cause the base station to transmit the PT-RS using the at least one of the time density or the frequency density.

19. The apparatus of claim 17, wherein the transmission comprises a physical uplink shared channel (PUSCH), and wherein the one or more processors are configured to cause the base station to receive the PT-RS using the at least one of the time density or the frequency density.

20. The apparatus of claim 17, wherein the one or more processors are configured to cause the base station to determine the time density for the PT-RS based on the inter-slot repetition of the transmission.

21. The apparatus of claim 20, wherein the one or more processors are configured to cause the base station to determine the time density for the PT-RS further based on a modulation and coding scheme (MCS) for the transmission, wherein for a MCS level different time densities are associated with different repetition levels.

22. The apparatus of claim 17, wherein the one or more processors are configured to cause the base station to determine the frequency density for the PT-RS based on the inter-slot repetition of the transmission.

23. The apparatus of claim 22, wherein the one or more processors are configured to cause the base station to determine the frequency density for the PT-RS further based on a bandwidth for the transmission, wherein for a bandwidth level different frequency densities are associated with different repetition levels.

24. The apparatus of claim 17, wherein the one or more processors are configured to cause the base station to determine the time density and the frequency density for the PT-RS based on the inter-slot repetition of the transmission.

25. The apparatus of claim 17, wherein the one or more processors are configured to cause the base station to determine the at least one of the time density or the frequency density based on whether the transmission comprises a first number of inter-slot repetitions that meets one or more of a first number of repetitions or a second number of repetitions.

26. The apparatus of claim 25, wherein the one or more processors are configured to cause the base station to configure the UE for the PT-RS in radio resource control (RRC) signaling and configure one or more of a first parameter for the first number of repetitions or a second parameter for the second number of repetitions.

27. The apparatus of claim 26, wherein the one or more processors are configured to cause the base station to indicate that the time density or the frequency density for the PT-RS is not present by configuring the first number of repetitions equal to the second number of repetitions.

28. The apparatus of claim 25, wherein one or more of the first number of repetitions or the second number of repetitions is defined.

29. The apparatus of claim 17, wherein the one or more processors are configured to cause the base station to:
determine the time density for the PT-RS is determined based on a modulation and coding scheme (MCS) of the transmission if the inter-slot repetition is not enabled for the transmission, and
determine the time density for the PT-RS not based on the MCS of the transmission if the inter-slot repetition is enabled for the transmission.

30. The apparatus of claim 29, wherein if the inter-slot repetition is enabled, the time density for the PT-RS is based on the frequency density for the PT-RS.

31. The apparatus of claim 17, wherein the PT-RS is disabled when a number of repetitions is above a threshold.

32. The apparatus of claim 31, wherein the transmission comprises a physical uplink shared channel (PUSCH).

33. A method of wireless communication at a user equipment (UE), comprising:
receiving a configuration for a phase tracking reference signal (PT-RS);
determining at least one of a time density or a frequency density for the PT-RS based on inter-slot repetition of a transmission; and
receiving or transmitting the PT-RS based on the at least one of the time density or the frequency density determined based on the inter-slot repetition of the transmission.

34. The method of claim 33, wherein the UE determines the time density for the PT-RS based on the inter-slot repetition of the transmission.

35. The method of claim 33, wherein the UE determines the frequency density for the PT-RS based on the inter-slot repetition of the transmission.

36. The method of claim 33, wherein the UE determines the at least one of the time density or the frequency density based on whether the transmission comprises a first number of inter-slot repetitions that meets one or more of a first number of repetitions or a second number of repetitions.

37. A method wireless communication at a base station, comprising:
configuring a user equipment (UE) for a phase tracking reference signal (PT-RS);
determining at least one of a time density or a frequency density for the PT-RS based on inter-slot repetition of a transmission; and
receiving or transmitting the PT-RS based on the at least one of the time density or the frequency density determined based on the inter-slot repetition of the transmission.

38. A method of claim 37, wherein the base station determines the time density for the PT-RS based on the inter-slot repetition of the transmission.

39. A method of claim 37, wherein the base station determines the frequency density for the PT-RS based on the inter-slot repetition of the transmission.

40. A method of claim 37, wherein the base station determines the at least one of the time density or the frequency density based on whether the transmission comprises a first number of inter-slot repetitions that meets one or more of a first number of repetitions or a second number of repetitions.

* * * * *